(12) United States Patent
Hiroishi et al.

(10) Patent No.: US 11,390,724 B2
(45) Date of Patent: *Jul. 19, 2022

(54) CELLULOSE-FIBER DISPERSION POLYETHYLENE RESIN COMPOSITE MATERIAL, FORMED BODY AND PELLET USING SAME, PRODUCTION METHOD THEREFOR, AND RECYCLING METHOD FOR CELLULOSE-FIBER ADHESION POLYETHYLENE THIN FILM PIECE

(71) Applicant: FURUKAWA ELECTRIC CO., LTD., Tokyo (JP)

(72) Inventors: Jirou Hiroishi, Tokyo (JP); Hidekazu Hara, Tokyo (JP); Yuka Sawada, Tokyo (JP); Masami Tazuke, Tokyo (JP); Toshihiro Suzuki, Tokyo (JP); Shingo Mitsugi, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 197 days.

This patent is subject to a terminal disclaimer.

(21) Appl. No.: 16/641,192

(22) PCT Filed: Aug. 23, 2017

(86) PCT No.: PCT/JP2017/030215
§ 371 (c)(1),
(2) Date: Feb. 21, 2020

(87) PCT Pub. No.: WO2019/038869
PCT Pub. Date: Feb. 28, 2019

(65) Prior Publication Data
US 2021/0139664 A1 May 13, 2021

(51) Int. Cl.
*C08J 11/08* (2006.01)
*C08J 3/21* (2006.01)
*C08L 23/06* (2006.01)

(52) U.S. Cl.
CPC ............. *C08J 11/08* (2013.01); *C08J 3/212* (2013.01); *C08L 23/06* (2013.01); *C08J 2323/06* (2013.01); *C08J 2401/02* (2013.01); *C08J 2423/12* (2013.01); *C08J 2467/02* (2013.01); *C08J 2477/06* (2013.01); *C08L 2205/03* (2013.01)

(58) Field of Classification Search
USPC ............ 428/34.1, 35.7, 411.1, 364; 528/190, 528/193, 194, 271, 272
See application file for complete search history.

(56) References Cited

U.S. PATENT DOCUMENTS

| | | | |
|---|---|---|---|
| 4,332,748 A | 6/1982 | Fremont | |
| 5,100,603 A | 3/1992 | Neefe | |
| 5,120,776 A | 6/1992 | Raj et al. | |
| 5,331,087 A | 7/1994 | Menges | |
| 5,390,860 A | 2/1995 | Ali et al. | |
| 5,759,680 A | 6/1998 | Brooks et al. | |
| 2005/0084671 A1 | 4/2005 | Medoff et al. | |
| 2007/0113705 A1 | 5/2007 | Szente et al. | |
| 2009/0211303 A1 | 8/2009 | Digiovanni et al. | |
| 2014/0227605 A1 | 8/2014 | Nakamura et al. | |
| 2014/0336309 A1 | 11/2014 | Sakata et al. | |
| 2016/0002461 A1 | 1/2016 | Tsujii et al. | |
| 2017/0080603 A1 | 3/2017 | Lovis et al. | |
| 2017/0101489 A1 | 4/2017 | Gahleitner et al. | |
| 2020/0010654 A1 | 1/2020 | Kim et al. | |
| 2020/0062921 A1* | 2/2020 | Hara | ...................... C08L 23/06 |
| 2020/0079920 A1* | 3/2020 | Sawada | ................... B29B 17/04 |
| 2020/0172684 A1* | 6/2020 | Hiroishi | ............... C08G 63/183 |

FOREIGN PATENT DOCUMENTS

| | | |
|---|---|---|
| CN | 1278209 A | 12/2000 |
| CN | 1281390 A | 1/2001 |
| CN | 1637208 A | 7/2005 |
| CN | 1789557 A | 6/2006 |
| CN | 101054779 A | 10/2007 |
| CN | 102421852 A | 4/2012 |
| CN | 103144214 A | 6/2013 |
| CN | 103781831 A | 5/2014 |
| CN | 105026477 A | 11/2015 |
| CN | 105253708 A | 1/2016 |
| CN | 107708950 A | 2/2018 |
| CN | 110023399 A | 7/2019 |
| CN | 110023400 A | 7/2019 |
| CN | 110248993 A | 9/2019 |
| EP | 2 123 418 A1 | 11/2009 |
| EP | 2296858 A | 3/2011 |
| EP | 2463071 A1 | 6/2012 |
| EP | 2 682 421 A1 | 1/2014 |
| EP | 2 811 489 A1 | 12/2014 |
| EP | 3 441 425 A1 | 2/2019 |
| EP | 3549980 A1 | 10/2019 |
| EP | 3604424 A1 | 2/2020 |

(Continued)

OTHER PUBLICATIONS

Chinese Office Action and Search Report for corresponding Chinese Application No. 201780094074.8, dated Jun. 3, 2021, with English translation.

(Continued)

*Primary Examiner* — Terressa Boykin
(74) *Attorney, Agent, or Firm* — Birch, Stewart, Kolasch & Birch, LLP

(57) ABSTRACT

A cellulose-fiber dispersion polyethylene resin composite material, formed by dispersing a cellulose fiber into a polyethylene resin, wherein a proportion of the cellulose fiber is 1 part by mass or more and 70 parts by mass or less in a total content of 100 parts by mass of the polyethylene resin and the cellulose fiber, and wherein water absorption ratio satisfies the following formula; and a formed body and a pellet using the same, a production method therefor, and a recycling method for a cellulose-fiber adhesion polyethylene thin film piece.

(water absorption ratio)<(cellulose effective mass ratio)$^2$×0.01    [Formula].

31 Claims, 1 Drawing Sheet

(56) References Cited

FOREIGN PATENT DOCUMENTS

| | | |
|---|---|---|
| JP | 5-50427 A | 3/1993 |
| JP | 6-65883 A | 3/1994 |
| JP | 6-73231 A | 3/1994 |
| JP | 6-76644 A | 3/1994 |
| JP | 6-173182 A | 6/1994 |
| JP | 7-224192 A | 8/1995 |
| JP | 2000-62746 A | 2/2000 |
| JP | 2001-192508 A | 7/2001 |
| JP | 2004-58254 A | 2/2004 |
| JP | 2004-358423 A | 12/2004 |
| JP | 2006-347031 A | 12/2006 |
| JP | 2007-45863 A | 2/2007 |
| JP | 2007-98211 A | 4/2007 |
| JP | 2007-260941 A | 10/2007 |
| JP | 2009-274318 A | 11/2009 |
| JP | 2010-269544 A | 12/2010 |
| JP | 2011-93990 A | 5/2011 |
| JP | 4680000 B2 | 5/2011 |
| JP | 2011-116838 A | 6/2011 |
| JP | 2011-190322 A | 9/2011 |
| JP | 2011-219571 A | 11/2011 |
| JP | 4846405 B2 | 12/2011 |
| JP | 2012-82364 A | 4/2012 |
| JP | 4950939 B2 | 6/2012 |
| JP | 2013-18916 A | 1/2013 |
| JP | 2013-35272 A | 2/2013 |
| JP | 2013-161590 A | 8/2013 |
| JP | 2014-15512 A | 1/2014 |
| JP | 2015-183153 A | 10/2015 |
| JP | 2015-209439 A | 11/2015 |
| JP | 2016-20096 A | 2/2016 |
| JP | 2016-94538 A | 5/2016 |
| JP | 2017-128716 A | 7/2017 |
| JP | 2017-128717 A | 7/2017 |
| JP | 2017-145392 A | 8/2017 |
| JP | 2017-145393 A | 8/2017 |
| JP | 6210582 B2 | 10/2017 |
| JP | 6210583 B2 | 10/2017 |
| PL | 201466 B1 | 4/2009 |
| RU | 2526067 C1 | 8/2014 |
| WO | WO 98/47681 A | 10/1998 |
| WO | WO 99/11453 A1 | 3/1999 |
| WO | WO 99/19081 A1 | 4/1999 |
| WO | WO 00/78127 A1 | 12/2000 |
| WO | WO 2006/048332 A1 | 5/2006 |
| WO | WO 2007/130201 A | 11/2007 |
| WO | WO 2009/141796 A1 | 11/2009 |
| WO | WO 2014/153076 A1 | 9/2014 |
| WO | WO 2016/199942 A1 | 12/2016 |
| WO | WO 2018/105173 A1 | 6/2018 |
| WO | WO 2018/105174 A1 | 6/2018 |
| WO | WO 2018/180469 A1 | 10/2018 |

OTHER PUBLICATIONS

International Search Report for PCT/JP2017/030215 (PCT/ISA/210) dated Oct. 17, 2017.
Office Action for JP Patent Application No. 2017-004664 dated Feb. 14, 2017.
Office Action for JP Patent Application No. 2017-004665 dated Feb. 14, 2017.
Extended European Search Report for European Application No. 17922753.3, dated Mar. 1, 2021.
Japanese Office Action for corresponding Japanese Application No. 2019-537492, dated Mar. 9, 2021, with English translation.
Sanchez-Cadena et al., "Hot-pressed boards based on recycled high-density polyethylene tetrapack: Mechanical properties and fracture behavior". Journal of Reinforced Plastics and Composites, vol. 32, No. 23, 2013, pp. 1779-1792.
Chinese Office Action and Search Report for Chinese Application No. 201780074788.2, dated May 21, 2021, with English translation.
Chinese Office Action and Search Report for Chinese Application No. 201880053610.4, dated Dec. 28, 2021, with English translation.
Chinese Office Action and Search Report for Chinese Application No. 201880057926.0, dated Dec. 9, 2021, with English translation.
Chinese Office Action and Search Report for Chinese Application No. 201380058045.0, dated Dec. 21, 2021, with English translation.
Chinese Office Action and Search Report, dated Jun. 2, 2021, for Chinese Application No. 201780094025.4, with English translation.
Chinese Office Action and Search Report, dated May 31, 2021, for Chinese Application No. 201780074783.X, with English translation.
Data Sheet of Moplen EP500V, 2021, 2 pages total.
Deng et al., "Aquatic Product Marketing," Zhongyuan Farmers Press, 2016, p. 60 (2 pages total).
El-Sabbagh et al., "Flowability and Fiber Content Homogeneity of Natural Fiber Polypropylene Composites in Injection Molding," Proceedings of the Regional Conference Graz 2015—Polymer Processing Society PPS, 2015, pp. 060010-1-060010-5, 5 pages total.
Extended European Search Report for European Application No. 17844598.7, dated Dec. 6, 2019.
Extended European Search Report for European Application No. 17877541.7, dated Apr. 8, 2020.
Extended European Search Report for European Application No. 17922752.5, dated Mar. 1, 2021.
Extended European Search Report for European Application No. 18847322.7, dated Apr. 12, 2021.
Extended European Search Report for European Application No. 18848639.3, dated Apr. 13, 2021.
Extended European Search Report for European Application No. 18849169.0, dated Apr. 21, 2021.
International Preliminary Report on Patentability and English Translation of Written Opinion of the International Searching Authority dated Feb. 25, 2020, for PCT/JP2018/031250 (Forms PCT/IB/373 and PCT/ISA/237).
International Search Report for International Application No. PCT/JP2017/030214, dated Oct. 17, 2017.
International Search Report for International Application No. PCT/JP2017/030216, dated Nov. 7, 2017.
International Search Report for International Application No. PCT/JP2017/030217, dated Nov. 7, 2017.
International Search Report for PCT/JP2018/031251 dated Nov. 20, 2018.
International Search Report issued in PCT/JP2018/031249 (PCT/ISA/210), dated Nov. 13, 2018.
International Search Report issued in PCT/JP2018/031250 (PCT/ISA/210), dated Nov. 27, 2018.
Japanese Office Acton for Japanese Application No. 2017-004664, dated Aug. 15, 2017, with English translation.
Japanese Office Action for Japanese Application No. 2017-004665, dated Aug. 15, 2017, with English translation.
Japanese Office Action for Japanese Application No. 2019-537491, dated Mar. 2, 2021, with English translation.
Jeremic, "Polyethylene," Ullmann's Encyclopedia of Industrial Chemistry, 2014, pp. 1-42.
Machine Translation of JP-2007-260941, dated Oct. 11, 2007.
Machine Translation of JP-2011-190322, dated Sep. 29, 2011.
Machine Translation of JP-2017-128716-A, dated Jul. 27, 2017.
Machine Translation of JP-2017-128717-A, dated Jul. 27, 2017.
U.S. Corrected Notice of Allowance for U.S. Appl. No. 16/797,654, dated Feb. 11, 2022.
U.S. Notice of Allowance for U.S. Appl. No. 16/466,226. dated Feb. 7, 2022.
U.S. Notice of Allowance for U.S. Appl. No. 16/466,226, dated Oct. 27, 2021.
U.S. Notice of Allowance for U.S. Appl. No. 16/797,654, dated Jan. 10, 2022.
U.S. Notice of Allowance for U.S. Appl. No. 16/797,654, dated Jan. 27, 2022.
U.S. Notice of Allowance for U.S. Appl. No. 16/797,654, dated Sep. 7, 2021.
U.S. Office Action for U.S. Appl. No. 16/466,276, dated Apr. 13, 2021.
U.S. Office Action for U.S. Appl. No. 16/797,654, dated May 3, 2021.

(56) References Cited

OTHER PUBLICATIONS

U.S. Office Action for U.S. Appl. No. 16/797,691, dated Nov. 16, 2021.
U.S. Office Action for U.S. Appl. No. 16/797,938, dated Dec. 10, 2021.
U.S. Office Action for U.S. Appl. No. 16/466,276, dated Oct. 26, 2020.
Written Opinion of the International Searching Authority (Form PCT/ISA/237) for International Application No. PCT/JP2018/031249, dated Nov. 13, 2018, with an English translation.
Written Opinion of the International Searching Authority (form PCT/ISA/237), dated Nov. 20, 2018, for International Application No. PCT/JP2018/031251, with an English translation.
Japanese Office Action for Japanese Application No. 2019-537695, dated Dec. 14, 2021, with an English translation.
Japanese Office Action for Japanese Application No. 2019-537696, dated Dec. 14, 2021, with an English translation.
Japanese Office Action for Japanese Application No. 2019-537697, dated Dec. 14, 2021, with an English translation.
U.S. Office Action for U.S. Appl. No. 16/466,276, dated Sep. 8, 2021.
U.S. Notice of Allowance for U.S. Appl. No. 16/466,226, dated Mar. 10, 2022.
U.S. Notice of Allowance for U.S. Appl. No. 18/797,938, dated May 31, 2022.
U.S. Office Action for U.S. Appl. No. 16/466,276, dated Mar. 24, 2022.

\* cited by examiner

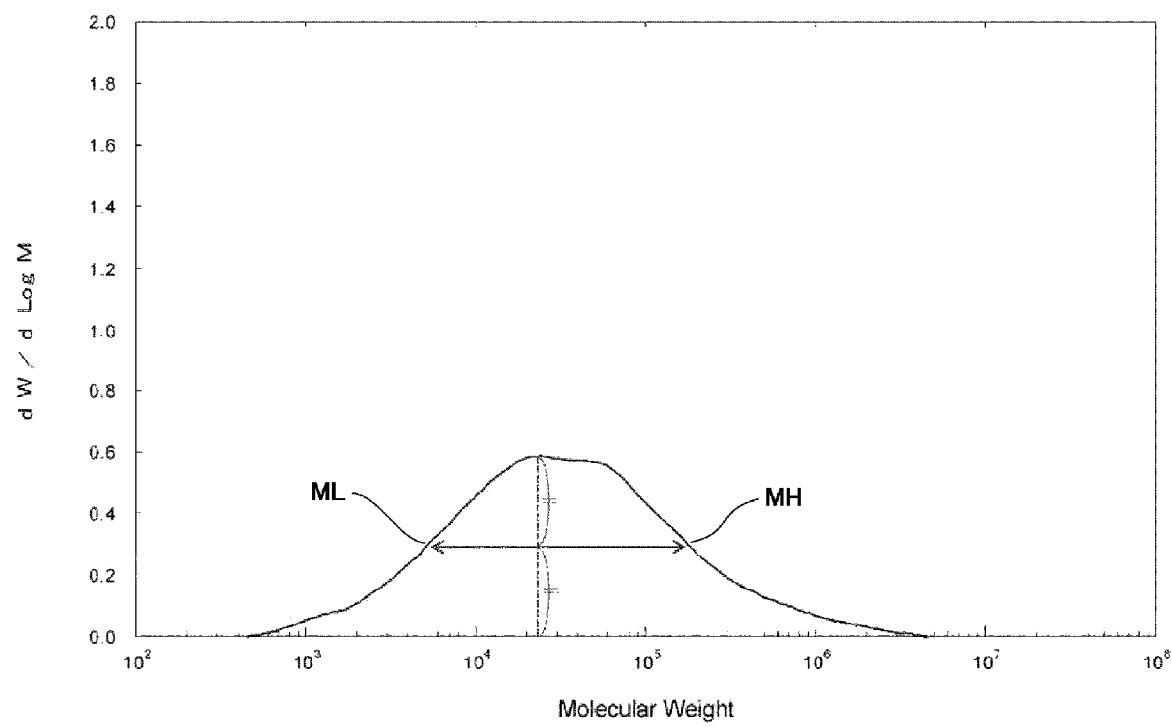

CELLULOSE-FIBER DISPERSION POLYETHYLENE RESIN COMPOSITE MATERIAL, FORMED BODY AND PELLET USING SAME, PRODUCTION METHOD THEREFOR, AND RECYCLING METHOD FOR CELLULOSE-FIBER ADHESION POLYETHYLENE THIN FILM PIECE

TECHNICAL FIELD

The present invention relates to a cellulose-fiber dispersion polyethylene resin composite material, a formed body and a pellet using the same, a production method therefor, and a recycling method for a cellulose-fiber adhesion polyethylene thin film piece.

BACKGROUND ART

Laminated paper forming a beverage container made of paper, such as a milk carton, is mainly a laminate in which a polyethylene thin film is attached on a surface of paper composed of a cellulose fiber, and it is necessary to perform treatment of separating a paper portion (pulp) and a polyethylene thin film portion upon recycling thereof.

As a separation treatment method, a method of striping off the paper portion from the laminated paper by agitating the laminated paper in water for a long time in a device called a pulper is general, and the thus separated paper portion is applied as a raw material of recycled paper.

However, the polyethylene thin film is in a state in which a large number of paper components (paper pieces composed of the cellulose fiber) are nonuniformly adhered to the surface thereof, in which sizes and shapes are all various, and the cellulose fiber adhered to the polyethylene thin film absorbs a large amount of water upon separation treatment of the paper by the above-described pulper. In order to recycle such a polyethylene thin film as the raw material of a resin product, sufficient drying treatment is required, and a large quantity of energy is consumed for recycling. Moreover, the size and the shape of the raw material are nonuniform, and therefore it has been difficult to knead the raw material to obtain a resin having homogeneous composition and physical properties. Therefore, such a cellulose-fiber adhesion polyethylene thin film piece is directly landfilled and disposed of or recycled as a fuel under actual circumstances.

Therefore, from a viewpoint of reducing an environmental load, development of a technology according to which the above-described polyethylene thin film can be recycled as the raw material of the resin product has been desired.

JP-A-2000-62746 ("JP-A" means unexamined published Japanese patent application) (Patent Literature 1) discloses a mold-molding technology on recycling a used beverage container formed of laminated paper to produce a packaging tray, and describes the technology in which a cellulose-fiber adhesion polyethylene thin film piece separated from the laminated paper by using a pulper is dried and pulverized, and then the resulting material is molded into a plate form by using a primary molding machine, and is further mold-molded, as secondary molding, into a predetermined shape such as an egg packaging tray by a high-temperature molding machine.

Moreover, Japanese patent No. 4680000 (Patent Literature 2) describes, as a recycling technology on a used beverage container formed of laminated paper, a method in which the laminated paper is directly pulverized into small pieces without separating the laminated paper into a paper portion and a polyethylene thin film portion to produce a paper-containing resin composition by kneading the small pieces together with polypropylene and the like by a twin screw extruder, and further a flow improver is added thereto, and the resulting material is injection molded.

Moreover, Japanese patent No. 4950939 (Patent Literature 3) discloses a technology on combining a used PPC sheet with a used PET material such as a used beverage container, and the like, and recycling the resulting material, and describes a method in which the PPC sheet is finely cut and water is contained therein, and then the resulting material is kneaded together with a finely cut PET material in the presence of water in a subcritical state to prepare a resin for injection molding.

According to the technology in this Patent Literature 3, a cellulose fiber of the PPC sheet and a melted PET material are easily mixed in a relatively uniform manner by kneading the PPC sheet and the PET material in the presence of water in the subcritical state.

Moreover, it is known that, if the cellulose fibers are uniformly dispersed into the resin, physical properties are improved, for example, flexural strength is improved in comparison with a resin alone, or the like. For example, JP-A-2011-93990 (Patent Literature 4) discloses a technology in which a non-fibrillated fibrous cellulose and a thermoplastic resin are melt kneaded by using a batch type closed kneading device to produce a resin formed body which contains the cellulose fiber and has high strength.

CITATION LIST

Patent Literatures

Patent Literature 1: JP-A-2000-62746
Patent Literature 2: Japanese Patent No. 4680000
Patent Literature 3: Japanese Patent No. 4950939
Patent Literature 4: JP-A-2011-93990

SUMMARY OF INVENTION

Technical Problem

However, according to the technology described in Patent Literature 1, a packaging tray is produced simply by mold-molding without performing kneading in a melted state, in which melt kneading is not performed in the presence of water in a subcritical state as described later. Therefore, paper wastes containing polyethylene are finely pulverized, and mold-molding is performed in Patent Literature 1. However, there is no melt kneading step, and therefore a bias is caused in a distribution of celluloses. Further, in mold-molding, the material is only heated and fused, and an amount of fused portions of thin film pieces with each other is small, and there is a problem in which a dispersion state of a cellulose fiber is unable to be sufficiently uniformized, and strength of the fused portion of a formed body is low. Moreover, such a formed body is in a state in which a large number of cellulose fibers are exposed from the resin, and therefore has characteristics which are easy to absorb water and hard to dry, and an application thereof is limited.

Moreover, according to the technology described in Patent Literature 2, the material is pulverized into a fine particle diameter of 0.5 mm to 2.5 mm without stripping off a paper portion from laminated paper, and polypropylene or modified polypropylene is added thereto, the resulting material is kneaded by a twin screw extruder to obtain a paper-containing resin composition, and further a mixture containing a flow improver is added thereto and injection molding is performed. That is, the technology described in Patent Literature 2 is not an art in which a moisture-containing cellulose-fiber adhesion polyethylene thin film piece obtained from waste paper of the laminated paper is melted and kneaded in the presence of water in the subcritical state. Further, Patent Literature 2 describes a paper-containing resin composition containing conifer bleached chemical pulp. However, the resin used in this composition is polypropylene or a modified polypropylene resin, and is not polyethylene. Further, the technology described in Patent Literature 2 has a problem in which an amount of the cellulose contained in the paper-containing resin composition is relatively large, and good flowability is unable to be obtained during kneading as it is, and when the formed body is prepared, fluctuation of material strength or production of a portion in which sufficient strength is not obtained is caused. In order to solve the problem, Patent Literature 2 describes addition of polypropylene or a flow improver as the raw material separately, but describes nothing on using polyethylene.

Moreover, Patent Literature 3 refers to an invention relating to a production method for a resin for injection molding by allowing water to contain in a PPC sheet being a used discharging paper discharged from an office, and then dewatering the PPC sheet, mixing the resulting material with a PET resin or a PP resin, and performing subcritical or supercritical treatment.

The invention described in Patent Literature 3 is an art of simply preparing PPC waste paper and container recycle resins such as a PET resin, separately, and performing mixing treatment and recycling the resulting material, and is not an art of recycling an thin film piece which is obtained by removing a paper component by applying pulper treatment to a beverage container made of paper, and is in a state in which a large amount of water is contained, and sizes and shapes are all various, and cellulose is nonuniformly adhered to the resin.

In the technology described in Patent Literature 3, a large number of cellulose fibers composing the PPC sheet are complicatedly entangled, and it is difficult to sufficiently defibrate the fibers into a loose state, and therefore a material obtained by finely cutting the PPC sheet is used.

Moreover, water absorption from a cut surface is dominant in the PPC sheet, and therefore unless the PPC sheet is finely cut and water-containing or dewatering treatment is performed in order to increase a surface area of the cut surface, defibration of the cellulose fiber by the subcritical or supercritical treatment does not sufficiently progress. When this cutting is not sufficiently performed, non-defibrated paper pieces (aggregate of cellulose fibers) remain in the produced resin for injection molding in no small part, and there is a problem which may cause reduction of strength of the resin for injection molding and reduction of water absorption characteristics.

Further, in the technology described in Patent Literature 4, upon charging a thermoplastic resin and fibrous cellulose as a separate material into an agitation chamber of a batch melt kneading device to melt knead the thermoplastic resin and the fibrous cellulose, while the fibrous cellulose is not melted, the thermoplastic resin is melted. That is, in the technology described in Patent Literature 4, the raw material to be used is a so-called pure article suitable for obtaining an objective resin composition, and the technology is not an art in which a material for recycling the thin film piece in a state in which a large amount of water is contained, and the sizes and the shapes are all various, and the cellulose is nonuniformly adhered to the resin, as mentioned above.

Moreover, when the thermoplastic resin and the fibrous cellulose which are different in physical properties are separately charged thereinto and mixed therein, it is difficult to form an integrated resin composition in which the fibrous cellulose is dispersed into the thermoplastic resin in a sufficiently uniform state. That is, an aggregate in which the fibrous cellulose is aggregated is easily produced, and strength of a resin formed body is liable to be reduced. Therefore, Patent Literature 4 describes use of the fibrous cellulose having an aspect ratio of 5 to 500.

The present invention relates to a recycling technology for a cellulose-fiber adhesion polyethylene thin film piece.

That is, the present invention is contemplated for providing a cellulose-fiber dispersion polyethylene resin composite material that is formed by dispersing a specific amount of cellulose fiber in a sufficiently uniform state in a polyethylene resin, is useful as a raw material of a resin product, and has predetermined water absorption relative to a predetermined cellulose effective mass ratio, and a pellet and a formed body using this composite material.

Moreover, the present invention is contemplated for providing a production method for a cellulose-fiber dispersion resin material that is useful as a raw material of a resin product by integrally treating, in a simple process, a cellulose-fiber adhesion polyethylene thin film piece that is obtained from a beverage pack or a food pack formed of polyethylene laminated paper having paper and a polyethylene thin layer, and is formed by adhering a cellulose fiber to a polyethylene thin film piece, and a recycling method including this method.

Solution to Problem

In view of the above-described problems, the present inventors diligently continued to conduct examination, and as a result, the present inventors found that polyethylene laminated paper forming a beverage container made of paper, such as a milk carton, is agitated in water to strip off and remove a paper portion therefrom by this agitation to obtain a polyethylene thin film piece to which a cellulose fiber is adhered, and cellulose fibers can be dispersed into a polyethylene resin in a sufficiently uniform state by melt kneading this thin film piece in the presence of water in a subcritical state, and that moisture can be removed by this melt kneading, and a composite material in which the polyethylene resin and the cellulose fiber are so-called integrated can be obtained with high energy efficiency.

That is, as mentioned above, the present inventors found that the composite material having excellent uniformity in which the cellulose fiber and the polyethylene resin are integrated is obtained by melt kneading, in the presence of water in the subcritical state, the above-described polyethylene thin film piece which has been so far difficult in recycling, for recycling as the resin material.

The present inventors continued to conduct further examination based on these findings and have completed the present invention.

That is, the above-described problem has been solved by the following means.

[1] A cellulose-fiber dispersion polyethylene resin composite material, formed by dispersing a cellulose fiber into a polyethylene resin, wherein a proportion of the cellulose fiber is 1 part by mass or more and 70 parts by mass or less in a total content of 100 parts by mass of the polyethylene resin and the cellulose fiber, and wherein water absorption ratio satisfies the following formula:

(water absorption ratio)<(cellulose effective mass ratio)$^2$×0.01.  [Formula]

[2] The cellulose-fiber dispersion polyethylene resin composite material described in the above item [1], wherein a proportion of the cellulose fiber is 5 parts by mass or more and less than 50 parts by mass in the total content of 100 parts by mass of the polyethylene resin and the cellulose fiber.

[3] The cellulose-fiber dispersion polyethylene resin composite material described in the above item [1] or [2], wherein a proportion of the cellulose fiber is 25 parts by mass or more and less than 50 parts by mass in the total content of 100 parts by mass of the polyethylene resin and the cellulose fiber.

[4] The cellulose-fiber dispersion polyethylene resin composite material described in the above item [1],
wherein a proportion of the cellulose fiber is 25 parts by mass or more and less than 50 parts by mass in the total content of 100 parts by mass of the polyethylene resin and the cellulose fiber, and
wherein tensile strength of a formed body upon forming the composite material is 20 MPa or more.

[5] The cellulose-fiber dispersion polyethylene resin composite material described in the above item [1],
wherein a proportion of the cellulose fiber is 25 parts by mass or more and less than 50 parts by mass in the total content of 100 parts by mass of the polyethylene resin and the cellulose fiber, and wherein tensile strength of a formed body upon forming the composite material is 25 MPa or more.

[6] The cellulose-fiber dispersion polyethylene resin composite material described in the above item [1],
wherein a proportion of the cellulose fiber is 1 part by mass or more and less than 15 parts by mass in the total content of 100 parts by mass of the polyethylene resin and the cellulose fiber, and
wherein flexural strength of a formed body upon forming the composite material is 8 to 20 MPa.

[7] The cellulose-fiber dispersion polyethylene resin composite material described in the above item [1],
wherein a proportion of the cellulose fiber is 15 parts by mass or more and less than 50 parts by mass in the total content of 100 parts by mass of the polyethylene resin and the cellulose fiber, and
wherein flexural strength of a formed body upon forming the composite material is 15 to 40 MPa.

[8] The cellulose-fiber dispersion polyethylene resin composite material described in any one of the above items [1] to [7], wherein the polyethylene resin satisfies a relationship: 1.7>half-width(Log(MH/ML))>1.0 in a molecular weight pattern obtained by gel permeation chromatography (GPC) measurement.

[9] The cellulose-fiber dispersion polyethylene resin composite material described in any one of the above items [1] to [8], containing a cellulose fiber having a fiber length of 1 mm or more.

[10] The cellulose-fiber dispersion polyethylene resin composite material described in any one of the above items [1] to [9], wherein a melt flow rate (MFR) at a temperature of 230° C. and a load of 5 kgf is 0.05 to 50.0 g/10 min.

[11] The cellulose-fiber dispersion polyethylene resin composite material described in any one of the above items [1] to [10], wherein the polyethylene resin contains low density polyethylene.

[12] The cellulose-fiber dispersion polyethylene resin composite material described in any one of the above items [1] to [11], wherein 50% by mass or more of the polyethylene resin is low density polyethylene.

[13] The cellulose-fiber dispersion polyethylene resin composite material described in any one of the above items [1] to [12], wherein 80% by mass or more of the polyethylene resin is low density polyethylene.

[14] The cellulose-fiber dispersion polyethylene resin composite material described in any one of the above items [1] to [13], wherein the polyethylene resin contains at least any one of linear low density polyethylene and high density polyethylene.

[15] The cellulose-fiber dispersion polyethylene resin composite material described in any one of the above items [1] to [14], wherein the composite material contains polypropylene, and a content of the polypropylene is 20 parts by mass or less based on the total content of 100 parts by mass of the polyethylene resin and cellulose fibers.

[16] The cellulose-fiber dispersion polyethylene resin composite material described in any one of the above items [1] to [15], wherein, when a hot xylene soluble mass ratio at 138° C. for the composite material is taken as Ga (%), a hot xylene soluble mass ratio at 105° C. for the composite material is taken as Gb (%), and an cellulose effective mass ratio is taken as Gc (%), the following formula is satisfied:

$\{(Ga-Gb)/(Gb+Gc)\} \times 100 \leq 20$ where, $Ga=\{(W0-Wa)/W0\} \times 100$, $Gb=\{(W0-Wb)/W0\} \times 100$, where, W0 denotes mass of a composite material before being immersed into hot xylene, Wa denotes mass of a composite material after being immersed into hot xylene at 138° C. and then drying and removing xylene, and Wb denotes mass of a composite material after being immersed into hot xylene at 105° C. and then drying and removing xylene, $Gc=\{Wc/W00\} \times 100$, where, Wc denotes an amount of mass reduction of a dry composite material while a temperature is raised from 270° C. to 390° C. in a nitrogen atmosphere, and W00 denotes mass of a dry composite material before a temperature is raised (at 23° C.).

[17] The cellulose-fiber dispersion polyethylene resin composite material described in any one of the above items [1] to [16],
wherein the composite material contains polyethylene terephthalate and/or nylon, and
wherein the total content of the polyethylene terephthalate and the nylon is 10 parts by mass or less based on a total content of 100 parts by mass of the polyethylene resin and the cellulose fiber.

[18] The cellulose-fiber dispersion polyethylene resin composite material described in the above item [15], wherein at least a part of the polyethylene resin and/or the polypropylene is derived from a recycled material.

[19] The cellulose-fiber dispersion polyethylene resin composite material described in any one of the above items [1] to [18], wherein the composite material is obtained by using, as a raw material, (a) polyethylene laminated paper having paper and a polyethylene thin film layer, and/or (b) a beverage pack and a food pack each formed of the polyethylene laminated paper.

[20] The cellulose-fiber dispersion polyethylene resin composite material described in any one of the above items [1] to [18], wherein the composite material is obtained by using, as a raw material, a cellulose-fiber adhesion polyethylene thin film piece.

[21] The cellulose-fiber dispersion polyethylene resin composite material described in the above item [20], wherein the cellulose-fiber adhesion polyethylene thin film piece is obtained by stripping off and removing a paper portion from (a) polyethylene laminated paper having paper and a polyethylene thin film layer, and/or (b) a beverage and a food pack each formed of the polyethylene laminated paper.

[22] The cellulose-fiber dispersion polyethylene resin composite material described in any one of the above items [1] to [21], wherein the composite material contains an inorganic material.

[23] The cellulose-fiber dispersion polyethylene resin composite material described in any one of the above items [1] to [22], wherein, in the composite material, water absorption after the composite material is immersed into water at 23° C. for 20 days is 0.1 to 10%, and impact resistance after the composite material is immersed into water at 23° C. for 20 days is higher than impact resistance before the composite material is immersed thereinto.

[24] The cellulose-fiber dispersion polyethylene resin composite material described in any one of the above items [1] to [23], wherein a linear expansion coefficient is $1\times10^{-4}$ or less.

[25] The cellulose-fiber dispersion polyethylene resin composite material described in any one of the above items [1] to [24], wherein a moisture content is less than 1% by mass.

[26] The cellulose-fiber dispersion polyethylene resin composite material described in any one of the above items [1] to [25], wherein a shape is pellet form.

[27] A formed body, which is formed by using the cellulose-fiber dispersion polyethylene resin composite material described in any one of the above items [1] to [26].

[28] A pellet, containing the formed body described in the above item [27] or a cut material thereof.

[29] A production method for a cellulose-fiber dispersion polyethylene resin composite material, including obtaining a composite material formed by dispersing a cellulose fiber into a polyethylene resin by melt kneading a cellulose-fiber adhesion polyethylene thin film piece formed by adhering a cellulose fiber in the presence of water in a subcritical state.

[30] The production method for the cellulose-fiber dispersion polyethylene resin composite material described in the above item [29], wherein the melt kneading is performed by using a batch type closed kneading device, the thin film piece and water are charged into the batch type closed kneading device and agitated by rotating an agitation blade projected on an outer periphery of a rotary shaft of the device, and a temperature and a pressure in the device are increased by this agitation to convert water into a subcritical state.

[31] The production method for the cellulose-fiber dispersion polyethylene resin composite material described in the above item [30], wherein the melt kneading is performed by adjusting a peripheral speed at a leading edge of the agitating blade to 20 to 50 m/sec.

[32] The production method for the cellulose-fiber dispersion polyethylene resin composite material described in any one of the above items [29] to [31], wherein, in the composite material, a proportion of the cellulose fiber in a total content of 100 parts by mass of the polyethylene resin and the cellulose fiber is 1 part by mass or more and 70 parts by mass or less.

[33] The production method for the cellulose-fiber dispersion polyethylene resin composite material described in any one of the above items [29] to [32], wherein a composite material formed by dispersing a cellulose fiber into a polyethylene resin is obtained by applying volume reduction treatment to the thin film piece in a state of containing water, and melt kneading the resulting volume reduction treatment material.

[34] The production method for the cellulose-fiber dispersion polyethylene resin composite material described in any one of the above items [29] to [33], wherein the melt kneading is performed by adjusting water to 5 parts by mass and less than 150 parts by mass based on 100 parts by mass of the thin film piece.

[35] The production method for the cellulose-fiber dispersion polyethylene resin composite material described in any one of the above items [29] to [34], wherein the cellulose-fiber adhesion polyethylene thin film piece is a thin film piece obtained by stripping off and removing a paper portion from polyethylene laminated paper in which a polyethylene thin film is adhered on a surface of paper, and is in a state of containing water.

[36] The production method for the cellulose-fiber dispersion polyethylene resin composite material described in any one of the above items [29] to [35], wherein the melt kneading is performed by mixing a cellulose material.

[37] The production method for the cellulose-fiber dispersion polyethylene resin composite material described in any one of the above items [29] to [36], wherein the melt kneading is performed by mixing at least any one of low density polyethylene and high density polyethylene.

[38] The production method for the cellulose-fiber dispersion polyethylene resin composite material described in any one of the above items [29] to [37], wherein a proportion of the cellulose fiber in a total content of 100 parts by mass of the polyethylene resin and the cellulose fiber is 1 part by mass or more and 70 parts by mass or less and water absorption ratio satisfies the following formula:

$$\text{(Water absorption ratio)} < \text{(cellulose effective mass ratio)}^2 \times 0.01. \quad \text{[Formula]}$$

[39] The production method for the cellulose-fiber dispersion polyethylene resin composite material described in any one of the above items [29] to [38], wherein, in the composite material, a proportion of the cellulose fiber in the total content of 100 parts by mass of the polyethylene resin and the cellulose fiber is 1 part by mass or more and 70 parts by mass or less, and the polyethylene resin satisfies a relationship: $1.7 > \text{half-width}(\text{Log}(MH/ML)) > 1.0$ in a molecular weight pattern obtained by gel permeation chromatography measurement.

[40] A recycling method for a cellulose-fiber adhesion polyethylene thin film piece, including obtaining a cellulose-fiber dispersion polyethylene resin composite material by the production method for the cellulose-fiber dispersion polyethylene resin composite material described in any one of the above items [29] to [39].

[41] A production method for a formed body, including mixing the cellulose-fiber dispersion polyethylene resin composite material described in any one of the above items [1] to [26] or the pellet described in the above item [28] with at least any one of high density polyethylene and polypropylene, and obtaining a formed body by forming the mixture.

In the present invention, a numerical value range represented by using "to" means a range including numerical values described before and after "to" as a lower limit and an upper limit.

In the present invention, a term referred to as "polyethylene" means low density polyethylene and/or high density polyethylene (HDPE).

The above-described low density polyethylene means polyethylene having a density of 880 kg/m$^3$ or more and less than 940 kg/m$^3$. The above-described high density polyethylene means polyethylene having a density larger than the density of the above-described low density polyethylene.

The low density polyethylene may be so-called "low density polyethylene" and "ultralow density polyethylene" each having long chain branching, or linear low density polyethylene (LLDPE) in which ethylene and a small amount of α-olefin monomer are copolymerized, or further may be "ethylene-α-olefin copolymer elastomer" involved in the above-described density range.

Advantageous Effects of Invention

According to the production method for the cellulose-fiber dispersion polyethylene resin composite material of the present invention, a cellulose-fiber dispersion polyethylene resin composite material in which cellulose fibers are uniformly dispersed in a polyethylene resin, a moisture content is low and water absorption ratio is suppressed can be obtained, in a simple process and with high energy efficiency by using, as a raw material, a cellulose-fiber adhesion polyethylene thin film piece obtained by stripping off and removing a paper portion from polyethylene laminated paper in which a polyethylene thin film is adhered on a surface of paper, such as a used beverage container.

Moreover, in the cellulose-fiber dispersion polyethylene resin composite material of the present invention, the cellulose fibers are dispersed in the polyethylene resin in a uniform state, and further the moisture content is low and water absorption ratio is also low, and therefore adaptability to extrusion molding, injection molding and the like is high. Moreover, a formed body having excellent flexural strength, impact resistance and the like can be obtained by forming the cellulose-fiber dispersion polyethylene resin composite material in the present invention.

Further, the formed body of the present invention is formed by using the cellulose-fiber dispersion polyethylene resin composite material in the present invention, and the cellulose fibers are dispersed in the resin in a uniform state, and therefore homogeneity is high and the formed body is excellent in shape stability, and simultaneously excellent in flexural strength, impact resistance and the like, and can be used for many purposes.

Moreover, according to the recycling method of the present invention, polyethylene laminated paper such as a used beverage container, or a cellulose-fiber adhesion polyethylene thin film piece prepared by stripping off and removing the paper portion from the laminated paper is recycled for the cellulose-fiber dispersion polyethylene resin composite material having high adaptability to extrusion molding, injection molding and the like. Thus, the cellulose-fiber adhesion polyethylene thin film piece which has been so far substantially difficult to recycle as the resin can be effectively utilized, and wastes can be significantly reduced.

Other and further features and advantages of the invention will appear more fully from the following description, appropriately referring to the accompanying drawings.

BRIEF DESCRIPTION OF THE DRAWINGS

FIG. 1 is a diagram showing one example of a half-width of a molecular weight distribution. A width shown by an arrow in FIG. 1 represents the half-width.

MODE FOR CARRYING OUT THE INVENTION

Hereinafter, preferable embodiments of the present invention will be described in detail.

{Production Method for a Cellulose-Fiber Dispersion Polyethylene Resin Composite Material}

According to the production method of the present invention, a polyethylene thin film piece formed by adhering a cellulose fiber is used as a raw material. An origin of this polyethylene thin film piece is not particularly limited, and is preferably a cellulose-fiber adhesion polyethylene thin film piece obtained from a beverage pack and/or a food pack each formed of polyethylene laminated paper having paper and a polyethylene thin film layer. A production method for a composite material using this cellulose-fiber adhesion polyethylene thin film piece will be described below.

<Cellulose-Fiber Adhesion Polyethylene Thin Film Piece>

In a beverage pack and/or a food pack formed of polyethylene laminated paper having paper and a polyethylene thin film layer, high quality pulp which is tough and has beautiful appearance as a material of a paper portion is generally used, and such pulp is mainly composed of a cellulose fiber. Then, a polyethylene thin film is attached on a surface of such a paper portion by polyethylene extrusion lamination processing, and is configured so as to prevent penetration of beverage into the paper portion.

In order to recycle such a beverage pack and/or a food pack, in general, the paper portion is stripped off and removed from the laminated paper by charging such a pack into the pulper and agitating the pack in water to be separated into a polyethylene thin film portion and the paper portion. In that case, the polyethylene thin film portion contains a portion cut into nonuniform small pieces with a size of about 0.1 cm$^2$ to 500 cm$^2$ or a portion close to a size obtained by developing the beverage container. The surface of the polyethylene thin film portion on a side from which the paper portion is stripped off, is in a state in which a large number of cellulose fibers which are unable to be completely removed are still nonuniformly adhered thereto. In the present invention, as mentioned above, this polyethylene thin film portion is referred to as "cellulose-fiber adhesion polyethylene thin film piece". Moreover, in the cellulose-fiber adhesion polyethylene thin film piece, the paper portion is removed by using the pulper to a certain extent, and an amount of the cellulose fiber is smaller than the amount of the beverage pack and/or the food pack itself. That is, when the thin film piece is viewed as an aggregate of the cellulose-fiber adhesion polyethylene thin film pieces (thin film piece raw material as a whole), a proportion of the cellulose fiber in the total content of 100 parts by mass of the polyethylene resin and the cellulose fiber, in the dry mass, is preferably 1 part by mass or more and 70 parts by mass or less, further preferably 5 parts by mass or more and 70 parts by mass or less, and still further preferably 5 parts by mass or more and less than 50 parts by mass, and still further preferably 25 parts by mass or more and less than 50 parts by mass. Moreover, the cellulose-fiber adhesion polyethylene thin film piece obtained by being treated by using the pulper is in a state in which the cellulose fiber absorbs a large amount of water. In addition, an expression simply referred to as "the cellulose-fiber adhesion polyethylene thin film piece" in the present invention means a thin film piece in a state in which a moisture is removed (state of absorbing no water).

In general treatment by using the pulper, the cellulose-fiber adhesion polyethylene thin film piece ordinarily has a smaller amount of the cellulose fiber than the amount of the polyethylene resin in dry mass, when the thin film piece is viewed as the aggregate of the thin film (thin film raw material as a whole).

In the "cellulose-fiber adhesion polyethylene thin film piece", the cellulose fiber adhered thereto may be in a state in which the fibers are not brought into contact with each other and are dispersed or may be in a state in which the fibers are entangled with each other to retain a state of paper. The "cellulose-fiber adhesion polyethylene thin film piece" may contain the polyethylene resin, the cellulose fiber, a filler (kaolin or talc, for example) generally contained in order to enhance whiteness of the paper, a sizing agent and the like. Here, the sizing agent is an additive to be added for the purpose of suppressing permeability of liquid such as ink into the paper, preventing set-off or blurring, and providing the paper with a certain degree of water proofness. The sizing agent has a hydrophobic group and a hydrophilic group, and the hydrophobic group thereof is directed outward to give the paper with hydrophobicity. The sizing agent has an internal addition system and a surface system, and has a natural product and a synthetic product for both. As a main agent, rosin soap, alkylketene dimer (ADK), alkenyl succinic anhydride (ASA), polyvinyl alcohol (PVA), or the like is used. As a surface sizing agent, oxidized starch, a styrene-acryl copolymer, a styrene-methacrylic acid copolymer or the like is used. In addition thereto, other components may be contained within the range in which advantageous effects of the present invention are not adversely affected. For example, various additives which are contained in the laminated paper as the raw material, an ink component, and the like, can be contained. A content of other components described above each in the cellulose-fiber adhesion polyethylene thin film piece (in the cellulose-fiber adhesion polyethylene thin film piece from which moisture is removed) is ordinarily 0 to 10% by mass, and preferably 0 to 3% by mass.

<Action of Water in the Subcritical State>

According to the production method for the cellulose-fiber dispersion polyethylene resin composite material of the present invention, the above-described cellulose-fiber adhesion polyethylene thin film piece is melt kneaded in the presence of water in the subcritical state. That is, the cellulose-fiber dispersion polyethylene resin composite material formed by dispersing the cellulose fiber into the polyethylene resin can be produced by performing melt kneading while water in the subcritical state is allowed to act thereon.

Here, "water in the subcritical state" means water which is in a high temperature and high pressure state, and does not reach a critical point of water (temperature: 374° C. and pressure: 22 MPa), and more specifically, is in a state in which the temperature is equal to or more than a boiling point (100° C.) of water at atmospheric pressure, and is equal to or less than the critical point of water, and the pressure is at least near a saturated water vapor pressure.

In the water in the subcritical state, an ionic product becomes larger than the ionic product of water under an atmospheric pressure at 0° C. or more and 100° C. or less, and it is assumed that action of decomposing a polymer such as cellulose into low-molecular weight components is enhanced. It is considered that application of shear force by the melt kneading and a reaction in the subcritical state act thereon in a multiple manner, and the resin in which the cellulose fibers are dispersed in polyethylene in a sufficiently uniform state is obtained. The cellulose-fiber dispersion polyethylene resin composite material having uniform physical properties can be obtained, by utilizing such a reaction, from the cellulose-fiber adhesion polyethylene thin film piece as a composite of the cellulose fiber and the polyethylene, in which the size and the shape are nonuniform, and a state of adhesion of the cellulose fiber is also nonuniform.

For melt kneading the cellulose-fiber adhesion polyethylene thin film piece in the presence of water in the subcritical state, for example, a mixture of the cellulose-fiber adhesion polyethylene thin film piece and water can be melt kneaded in the subcritical state of water.

A method of melt kneading the cellulose-fiber adhesion polyethylene thin film piece in the presence of water in the subcritical state is not particularly limited. For example, the cellulose-fiber adhesion polyethylene thin film piece and water are charged into a closed space to intensively knead the thin film piece and water in such a closed space. Thus, the temperature and the pressure in the space rise and water can be turned into the subcritical state.

In addition, a term "closed" in the present invention is used in the meaning of a space which is closed from outside, but is not in a completely closed state. That is, as described above, the closed space means the space provided with a mechanism according to which, if the thin film piece and water are intensively kneaded in the closed space, the temperature and the pressure rise, but the vapor is discharged to outside under such a high temperature and a high pressure. Accordingly, while the melt kneading in the presence of water in the subcritical state is achieved by intensively kneading the thin film piece and water in the closed space, the moisture is continuously discharged to outside as the vapor, and therefore the moisture can be finally significantly reduced, or can be substantially completely removed.

A batch type closed kneading device can be preferably used for the melt kneading in the above-mentioned closed space, for example. As such a batch type closed kneading device, for example, a batch type high-speed agitating device manufactured by M&F Technology Co., Ltd., as described in WO 2004/076044 and a batch type high-speed agitating device similar thereto can be used. This batch type closed kneading device is provided with a cylindrical agitation chamber, and a plurality of agitation blades are projected on an outer periphery of a rotary shaft arranged by passing through the agitation chamber. Moreover, for example, these batch type high-speed agitating devices are provided with a mechanism according to which water vapor is released while the pressure in the agitation chamber is retained.

The temperature and the pressure inside the agitation chamber rapidly rise by application of high shear force by the rotating agitation blade to the cellulose-fiber adhesion polyethylene thin film piece and the water, and water in the subcritical state is produced. Thus, the cellulose fiber is released from a fixed state or thermally fused state in which the cellulose fiber is embedded on the surface of the polyethylene resin by intensive shear force by the high-speed agitation in combination with hydrolytic action of the cellulose by the water in the subcritical state. Further, each cellulose fiber is released from a network-shaped entanglement of the cellulose fibers with each other, and a shape of the cellulose is changed from a paper shape to a fibrous form. Thus, the cellulose fibers can be uniformly dispersed into the polyethylene resin. It is considered that the shear force by the melt kneading and a reaction with the water in the subcritical state act thereon in a multiple manner, and the cellulose-fiber dispersion polyethylene resin composite material having uniform physical properties can be obtained from the cellulose-fiber adhesion polyethylene thin film piece in which the size and the shape are nonuniform, and the state of adhesion of the cellulose fiber is also nonuniform.

As described above, the above-described batch type closed kneading device is provided with the cylindrical agitation chamber, and the plurality of agitation blades (for example, 4 to 8 blades) are projected on the outer periphery of the rotary shaft arranged by passing through the agitation chamber. The rotary shaft on which the agitation blades are arranged is connected to a motor being a drive source. Here, the temperature and the pressure are measured by a thermometer and a pressure gauge attached inside the agitation chamber, a melted state of the material is judged by using the temperature and the pressure measured from the thermometer and the pressure gauge, and the melt kneading can be judged. Moreover, the melted state can also be judged by measuring rotating torque applied to the motor, and a state of the material is not judged from the temperature and the pressure. For example, an end time point of the melt kneading can also be judged by measuring a change in the rotating torque of the rotary shaft to be measured from a torque meter. In the melt kneading, the agitation blades are rotated with a high speed. A peripheral speed (rotating speed) of the agitation blade is preferably 10 m/sec or more, and further preferably 20 to 50 m/sec as a peripheral speed at a leading edge of the agitation blade (leading edge portion farthest from the rotary shaft).

The end time point of the melt kneading using the batch type closed kneading device can be appropriately adjusted by taking the physical properties of the composite material obtained into consideration. Preferably, it is preferable to stop rotation of the rotary shaft within 30 seconds from a time point at which the rotating torque of the rotary shaft of the batch type closed kneading device rises and reaches a maximum value and then falls, and a torque change rate reached 5% or less per one second. Thus, a melt flow rate (MFR: temperature=230° C.; load=5 kgf) of the composite material obtained is easily adjusted to 0.05 to 50.0 g/10 min, and the physical properties can be further improved. In the composite material having the melt flow rate within the above-described range, the cellulose fibers are uniformly dispersed in the resin, the composite material is preferable for extrusion molding or injection molding, and a formed body having high shape stability, high strength, and high impact resistance can be prepared.

The reason why the melt flow rate of the composite material can be adjusted by controlling the end time point of the melt kneading is estimated, as a contributory factor, that a part of the molecules of the polyethylene resin and the cellulose fiber is decomposed into low-molecular weight components by action of the water in the subcritical state produced during the melt kneading.

In the present description, a term "torque change rate reaches 5% or less per one second" means that torque T1 at a predetermined time and torque T2 after one second from the predetermined time satisfies the following formula (T):

$$100 \times (T1-T2)T1 \leq 5.$$ Formula (T)

When the raw material containing the cellulose-fiber adhesion polyethylene thin film piece and water are charged into the batch type closed kneading device or kneader, the cellulose-fiber adhesion polyethylene thin film piece may be pulverized or subjected to volume reduction treatment according to necessity and treated into the size and bulk density facilitating to perform self-weight fall charge or the like and handling.

Here, "the volume reduction treatment" means treatment according to which the thin film piece is compressed to reduce a bulk volume, in which the moisture adhered to the thin film piece beyond necessity is also squeezed out by the compression on this occasion. The moisture adhered to the thin film piece beyond necessity can be squeezed out, and energy efficiency until the composite material is obtained can be further improved by applying the volume reduction treatment thereto.

As mentioned above, for example, the laminated paper is agitated in water (water or hot water) for a long time in the device called the pulper. Thus, the paper portion is stripped off from the laminated paper and the cellulose-fiber adhesion polyethylene thin film piece is obtained. In this cellulose-fiber adhesion polyethylene thin film piece, the moisture content ordinarily reaches around 50% by mass, and the thin film piece is in a state in which a large amount of water is absorbed. In such a cellulose-fiber adhesion polyethylene thin film piece, the moisture is squeezed by the volume reduction treatment, and the moisture content reaches around 20% by mass, for example. Moreover, an apparent volume is preferably adjusted to ½ to ⅕ by this volume reduction treatment. The device used in the volume reduction treatment is not particularly limited, but an extrusion system volume reduction machine having two screws is preferable. The thin film piece can be continuously treated, and simultaneously a volume-reduced material which is easily handled in a subsequent step, and is properly small in individual sizes can be obtained by using the extrusion system volume reduction machine having two screws. For example, DUAL PRETISER (model: DP-3N, manufactured by Oguma Iron Works Co., Inc.) or the like can be used.

Moreover, the cellulose-fiber adhesion polyethylene thin film piece in the state of absorbing water is pulverized, and this pulverized material can also be melt kneaded. Pulverizing treatment can be performed by using a pulverizer having a rotary blade, a pulverizer having a rotary blade and a fixed blade, and a pulverizer having a sliding blade, for example.

As the water to be used upon the melt kneading, as described above, cellulose-fiber-impregnated water adhered to the cellulose-fiber adhesion polyethylene thin film piece, or water adhered to the surface of the thin film piece, or the like can be directly used, and therefore the water only needs to be added when necessary.

In addition, the amount of water necessary upon the melt kneading is ordinarily 5 parts by mass or more and less than 150 parts by mass based on 100 parts by mass (dry mass) of the cellulose-fiber adhesion polyethylene thin film piece. The composite material in which the cellulose fibers are uniformly dispersed in the resin, the moisture content is less than 1% by mass, and has excellent formability is easily produced by adjusting the water to this range of the amount of water. The amount of water upon the melt kneading is further preferably 5 to 120 parts by mass, still further preferably 5 to 100 parts by mass, still further preferably 5 to 80 parts by mass, and still further preferably adjusted to 10 to 25 parts by mass, based on 100 parts by mass of the cellulose-fiber adhesion polyethylene thin film piece.

According to the production method of the present invention, in melt kneading the cellulose-fiber adhesion polyethylene thin film piece in the presence of water in the subcritical state, a cellulose material can be further mixed therein.

In this case, a blending amount of the cellulose material is preferably adjusted in such a manner that a proportion of the cellulose fiber becomes 1 part by mass or more and 70 parts by mass or less, further preferably 5 parts by mass or more and 70 parts by mass or less, still further preferably 5 parts by mass or more and less than 50 parts by mass, and particularly preferably 25 parts by mass or more and less than 50 parts by mass, in the total content of 100 parts by mass of the polyethylene resin and the cellulose fiber.

Examples of the cellulose material include a material mainly containing cellulose or a material containing cellulose, and more specifically, examples thereof include paper, waste paper, paper powder, regenerated pulp, paper sludge and broken paper of laminated paper. Above all, in view of cost and effective use of resources, waste paper and/or paper sludge is preferably used, and paper sludge is further preferably used. This paper sludge may contain an inorganic material in addition to the cellulose fiber. From a viewpoint of enhancing elastic modulus of the composite material, paper sludge containing an inorganic material is preferable. Moreover, when the impact strength of the composite material is emphasized, as the paper sludge, a material without containing an inorganic material, or a material having a small content, even if the material contains the inorganic material, is preferable. When the paper such as the waste paper is mixed therein, the paper is preferably wetted with the water in advance before the melt kneading. The composite material in which the cellulose fibers are uniformly dispersed in the resin is easily obtained by using the paper wetted with the water.

In the above-described melt kneading, at least any one of low density polyethylene and high density polyethylene can be further mixed therein. In this case, a blending amount of low density polyethylene and/or high density polyethylene is preferably adjusted in such a manner that, in the composite material obtained, a proportion of the cellulose fiber becomes 1 part by mass or more and 70 parts by mass or less in the total content of 100 parts by mass of the polyethylene resin and the cellulose fiber.

According to the production method of the present invention, the cellulose-fiber adhesion polyethylene thin film piece obtained from the beverage pack and/or the food pack formed of the polyethylene laminated paper having the paper and the polyethylene thin film layer is melt kneaded in the presence of water. In this beverage pack or food pack, there is also a material using a resin layer other than the polyethylene resin in addition to the material using the polyethylene resin as the resin layer. Moreover, as for the beverage pack and the food pack to be used as the raw material, a used material or an unused material can be used. When the used beverage pack or food pack is recovered and used, a resin component other than the polyethylene resin is mixed in the recovered material in several cases. In particular, polypropylene, polyethylene terephthalate, nylon, and the like, may be mixed. The composite material obtained by the present invention may contain such a resin other than the polyethylene resin. The composite material obtained by the production method of the present invention can contain, for example, polypropylene in an amount of 20 parts by mass or less based on the total content of 100 parts by mass of the polyethylene resin and the cellulose fiber. Moreover, for example, the composite material can contain polyethylene terephthalate and/or nylon in a total amount of 10 parts by mass or less based on the total content of 100 parts by mass of the polyethylene resin and the cellulose fiber.

The beverage pack and/or the food pack formed of the polyethylene laminated paper having the paper and the polyethylene thin film layer, or the cellulose-fiber adhesion polyethylene thin film piece obtained by providing these packs for treatment by using the pulper can be recycled, by performing the production method of the present invention, with a smaller amount of energy consumption and only by passing through a simple treatment step. That is, the beverage pack and/or the food pack or the cellulose-fiber adhesion polyethylene thin film piece as described above can be converted into the cellulose-fiber dispersion polyethylene resin composite material and can be recycled as the resin material of the resin product.

{Cellulose-Fiber Dispersion Polyethylene Resin Composite Material and a Formed Body Thereof}

The cellulose-fiber dispersion polyethylene resin composite material of the present invention (hereinafter, also referred to simply as "composite material of the present invention") is formed by dispersing the cellulose fiber into the polyethylene resin, in which a proportion of the cellulose fiber is 1 part by mass or more and 70 parts by mass or less in the total content of 100 parts by mass of the polyethylene resin and the cellulose fiber, and water absorption ratio satisfies the following formula.

$$(\text{Water absorption ratio}) < (\text{cellulose effective mass ratio})^2 \times 0.01 \quad \text{[Formula]}$$

The cellulose-fiber dispersion polyethylene resin composite material of the present invention can be obtained by the production method for the cellulose-fiber dispersion polyethylene resin composite material of the present invention as mentioned above. In the cellulose-fiber dispersion polyethylene resin composite material of the present invention, the cellulose fibers are dispersed in the polyethylene resin in a sufficiently uniform state, and adaptability to extrusion molding, injection molding and the like is high.

In the composite material of the present invention, the proportion of the cellulose resin in the total content of 100 parts by mass of the polyethylene resin and the cellulose resin is adjusted to 70 parts by mass or less. The cellulose fibers can be uniformly dispersed therein by the melt kneading in preparation of this composite material, and the water absorbing properties of the composite material obtained can be further suppressed by adjusting this proportion to 70 parts by mass or less. From viewpoints of further suppressing the water absorbing properties and further enhancing impact resistance as mentioned later, the proportion of the cellulose fiber in the total content of 100 parts by mass of the polyethylene resin and the cellulose fiber is preferably less than 50 parts by mass.

The proportion of the cellulose fiber in the total content of 100 parts by mass of the polyethylene resin and the cellulose fiber is 1 part by mass or more. Flexural strength to be mentioned later can be further improved by adjusting this proportion to 1 part by mass or more. From this viewpoint, the proportion of the cellulose fiber in the total content of 100 parts by mass of the polyethylene resin and the cellulose fiber is further preferably 5 parts by mass or more, and still further preferably 15 parts by mass or more. Moreover, if a point of further improving tensile strength is also taken into consideration, the proportion is preferably 25 parts by mass or more.

The proportion of the cellulose fiber in the total content of 100 parts by mass of the polyethylene resin and the cellulose fiber is preferably 5 parts by mass or more and less than 50 parts by mass, and further preferably 25 parts by mass or more and less than 50 parts by mass.

In the cellulose-fiber dispersion polyethylene resin composite material of the present invention, the water absorption ratio satisfies the following formula. If the water absorption ratio is excessively high, the mechanical characteristics such as flexural strength are reduced. If a cellulose effective mass ratio mentioned later is in the range of 5 to 40%, such a case is further preferable. In addition, "water absorption ratio" (unit: %) means the water absorption ratio upon immersing, into water at 23° C. for 20 days, a formed body having a length of 100, a width of 100 mm and a thickness of 1 mm shaped using the cellulose-fiber dispersion polyethylene resin composite material, which is measured according to the method described in Examples mentioned later.

(Water absorption ratio)<(cellulose effective mass ratio)$^2 \times 0.01$      [Formula]

Here, the cellulose effective mass ratio can be determined by performing a thermogravimetric analysis (TGA) from 23° C. to 400° C. at a heating rate of +10° C./min under a nitrogen atmosphere on a sample of a cellulose-fiber dispersion polyethylene resin composite material adjusted to a dry state by drying the sample at 80° C. for one hour in an ambient atmosphere in advance, and by calculating the cellulose effective mass ratio according to the following formula.

(Cellulose effective mass ratio [%])=(mass loss [mg] from 270° C. to 390° C.)×100/(mass [mg] of a composite material sample in a dry state before being provided for the thermogravimetric analysis)

In the composite material of the present invention, even though the composite material contains the cellulose fiber having high water absorbing properties, an increase of the water absorption ratio is suppressed to a predetermined level in this composite material. Although this reason is not certain, it is assumed that the water absorbing properties of the cellulose fiber are effectively masked by the polyethylene resin in such a manner that the cellulose fiber and the polyethylene resin are formed into a so-called integrated state by a form formed by uniformly dispersing the cellulose resin into the polyethylene resin, and the water absorbing properties are suppressed. Moreover, in order to uniformly disperse the cellulose fiber into the polyethylene resin, it is preferable to conduct melt kneading in the presence of water in the subcritical state. It is also considered, as one contributory factor of suppressing the water absorbing properties, that a part of the polyethylene resin is decomposed into low-molecular weight components in this melt kneading, a hydrophilic group is formed on the surface thereof, and this hydrophilic group is bonded with a hydrophilic group on the surface of the cellulose fiber, resulting in reducing the hydrophilic group on the surface thereof, or that the cellulose is decomposed by action of the water in the subcritical state in the melt kneading, and the hydrophilic group is reduced, or the like.

The polyethylene resin forming the composite material of the present invention preferably satisfies a relationship: 1.7>half-width(Log(MH/ML))>1.0 in a molecular weight pattern obtained by GPC measurement. Flowability and injection moldability of the composite material can be further improved by satisfying the above-described relationship, and the impact resistance can be further enhanced. The polyethylene resin forming the composite material of the present invention further preferably satisfies a relationship: 1.7>half-width(Log(MH/ML))>1.2, and still further preferably satisfies a relationship of 1.7>half-width(Log(MH/ML))>1.3.

As described above, such a molecular weight pattern of the polyethylene resin can be realized by performing high-speed melt kneading of the raw material containing the polyethylene resin in the presence of water upon preparing the composite material of the present invention. That is, such a pattern can be realized by allowing the polyethylene resin and the cellulose fiber to coexist in the presence of water in the subcritical state, and performing high-speed melt kneading thereof.

The above-described half-width of the molecular weight pattern shows spread of a spectrum (degree of the molecular weight distribution) around a peak top (maximum frequency) of a maximum peak of the molecular weight patterns in GPC. A width of a GPC spectral line in a place (a molecular weight on a high molecular weight side and a molecular weight on a low molecular weight side are referred to as MH and ML, respectively) in which intensity in the spectrum becomes a half of the peak top (maximum frequency) is taken as the half-width.

In the composite material of the present invention, with regard to the polyethylene resin forming the composite material, the molecular weight at which the maximum peak value is exhibited is preferably in the range of 10,000 to 1,000,000, in the molecular weight pattern obtained by gel permeation chromatography measurement, and the weight average molecular weight Mw is preferably in the range of 100,000 to 300,000. The impact characteristics tend to be further enhanced by adjusting the molecular weight at which the maximum peak value is exhibited to 10,000 or more and the weight average molecular weight to 100,000 or more. Moreover, the flowability tends to be further improved by adjusting the molecular weight at which the maximum peak value is exhibited to 1,000,000 or less and the weight average molecular weight to 300,000 or less.

The cellulose fiber contained in the composite material of the present invention preferably contains a cellulose fiber having a fiber length of 1 mm or more. Mechanical strength such as tensile strength and flexural strength can be further improved by containing the cellulose fiber having the fiber length of 1 mm or more.

In the composite material of the present invention, it is preferable that the proportion of the cellulose fiber is 25 parts by mass or more and less than 50 parts by mass in the total content of 100 parts by mass of the polyethylene resin and the cellulose fiber, the tensile strength upon forming the above-described composite material is 20 MPa or more. In the composite material of the present invention, it is further preferable that the proportion of the cellulose fiber is 25 parts by mass or more and less than 50 parts by mass in the total content of 100 parts by mass of the polyethylene resin and the cellulose fiber, and the tensile strength upon forming the above-described composite material is 25 MPa or more. In particular, as mentioned later, even if the polyethylene resin forming the composite material contains low density polyethylene as a main component or contains 80% by mass or more of low density polyethylene, it is preferable that the proportion of the cellulose fiber is 25 parts by mass or more and less than 50 parts by mass in the total content of 100 parts by mass of the polyethylene resin and the cellulose resin, and the tensile strength thereof is 20 MPa or more (and further preferably 25 MPa or more). Even if the polyethylene resin forming the composite material contains low density polyethylene as the main component or contains 80% by mass or more of low density polyethylene, the composite material exhibiting the above-described desired tensile strength can be obtained by the production method of the present invention as mentioned later.

The above-described tensile strength is measured by shaping the composite material into a specific shape. More specifically, the tensile strength is measured by the method in Examples to be described later.

In the composite material of the present invention, it is preferable that a proportion of the cellulose fiber is 1 part by mass or more and less than 15 parts by mass in the total content of 100 parts by mass of the polyethylene resin and the cellulose fiber, and the flexural strength of the formed body formed by forming the cellulose-fiber dispersion polyethylene resin composite material is 8 to 20 MPa.

Moreover, in the composite material of the present invention, it is also preferable that a proportion of the cellulose fiber is 15 parts by mass or more and less than 50 parts by mass in the total content of 100 parts by mass of the polyethylene resin and the cellulose fiber, and the flexural strength of the formed body formed by forming the cellulose-fiber dispersion polyethylene resin composite material is 15 to 40 MPa.

The above-described flexural strength is measured by shaping the composite material into a specific shape. More specifically, the flexural strength is measured by the method in Examples to be described later.

In the composite material of the present invention, a moisture content is preferably less than 1% by mass. The composite material of the present invention can be produced by melt kneading a resin-containing raw material in the presence of water. According to this method, water can be effectively removed as vapor while performing the melt kneading, and the moisture content of the cellulose-fiber dispersion polyethylene resin composite material obtained can be reduced to a level less than 1% by mass. Furthermore, in comparison with a case where removal of the moisture and the melt kneading are performed as different processes, energy consumption (power consumption or the like) required for the removal of the moisture can be significantly suppressed.

In the composite material of the present invention, the water absorption ratio after the composite material is immersed into water at 23° C. for 20 days is preferably 0.1 to 10%. The water absorption ratio of the composite material is measured by the method described in Examples to be mentioned later.

The cellulose-fiber dispersion polyethylene resin composite material of the present invention has properties in which water is hard to be absorbed as mentioned above. However, when a small amount of water is absorbed after forming, the composite material preferably has properties of enhanced impact resistance (without causing significant reduction of the flexural strength). Accordingly, the formed body using the cellulose-fiber dispersion polyethylene resin composite material of the present invention is also suitable for outdoor use.

The impact resistance is measured by the method described in Examples mentioned later.

In the composite material of the present invention, the water absorption ratio after the composite material is immersed into water at 23° C. for 20 days is 0.1 to 10%, and the impact resistance after the composite material is immersed into water at 23° C. for 20 days is higher than the impact resistance before the composite material is immersed thereinto.

In the cellulose-fiber dispersion polyethylene resin composite material of the present invention, the melt flow rate (MFR) at a temperature of 230° C. and a load of 5 kgf is preferably 0.05 to 50.0 g/10 min. Further satisfactory formability can be realized, and the impact resistance of the formed body obtained can be further enhanced, by adjusting MFR in the above-described preferable range. The melt flow rate is further preferably 0.5 to 10.0 g/10 min.

The composite material of the present invention can be processed into a pellet by melting and solidifying the composite material into an arbitrary shape and size or cutting the composite material. For example, the pellet can be obtained by extruding a pulverized material of the composite material of the present invention into a strand form by a twin screw extruder, cooling and solidifying the strand, and then cutting the resulting material. Alternatively, the pellet can be obtained by extruding the pulverized material of the composite material of the present invention and cutting the resulting material by a twin screw extruder provided with hot cutting. The size and the shape of these pellets are not particularly limited, and can be appropriately selected according to the purpose. For example, the pellet can be finished into a substantially column-shaped or disc-shaped grain having a diameter of several millimeters.

The polyethylene resin forming the composite material of the present invention preferably contains low density polyethylene, and low density polyethylene is further preferably the main component. Then, 50% by mass or more of the polyethylene resin forming the composite material of the present invention is further preferably low density polyethylene, and 80% by mass or more of the polyethylene resin forming the composite material of the present invention is still further preferably low density polyethylene.

The polyethylene resin forming the composite material of the present invention is also preferably contains at least any one of linear low density polyethylene and high density polyethylene.

The composite material of the present invention may contain polyethylene other than polyethylene derived from the cellulose-fiber adhesion polyethylene thin film piece. That is, in the above-described production method for the composite material of the present invention, polyethylene may be separately blended thereto in addition to the cellulose-fiber adhesion polyethylene thin film piece. The polyethylene to be blended thereto may be low density polyethylene, linear low density polyethylene or high density polyethylene, and one kind thereof or two or more kinds thereof may be mixed therein.

The composite material of the present invention may contain a resin component other than the polyethylene resin. For example, the composite material may contain polypropylene. In this case, a content of polypropylene is preferably 20 parts by mass or less based on the total content of 100 parts by mass of the polyethylene resin and the cellulose fiber.

Moreover, the composite material of the present invention may contain polyethylene terephthalate and/or nylon, for example. In this case, the composite material contains polyethylene terephthalate and/or nylon, and a total content of polyethylene terephthalate and/or nylon is preferably 10 parts by mass or less based on the total content of 100 parts by mass of the polyethylene resin and the cellulose fiber. Here, the total content of polyethylene terephthalate and/or nylon means the content of one kind when the composite material contains either polyethylene terephthalate or nylon, or means the total content of polyethylene terephthalate and nylon when the composite material contains both polyethylene terephthalate and nylon.

If a kind of the resin that may be mixed in the composite material is known, an amount of the resin other than the polyethylene resin can be determined based on a hot xylene soluble mass ratio for the composite material.

—Hot Xylene Soluble Mass Ratio—

The hot xylene soluble mass ratio is determined as described below in the present invention.

In accordance with measurement of a degree of cross-linking in JASO D 618 as the standard for automotive electrical cables, 0.1 to 1 g is cut out from a formed sheet of the composite material and taken as a sample, and this sample is wrapped with a 400-mesh stainless steel mesh, and immersed into 100 mL of xylene at a predetermined temperature for 24 hours. Next, the sample is pulled up therefrom and is dried in vacuum at 80° C. for 24 hours. From the mass of the sample before and after the test, the hot xylene soluble mass ratio G (%) is calculated according to the following formula:

$$G=\{(W0-W)/W0\}\times 100$$

where, W0 denotes mass of a composite material before being immersed into hot xylene, and W denotes mass of a composite material after being immersed into hot xylene and then drying and removing xylene.

For example, "the content of polypropylene is 20 parts by mass or less based on the total content of 100 parts by mass of the polyethylene resin and the cellulose fiber" means that, when a hot xylene soluble mass ratio at 138° C. for the composite material is taken as Ga (%), a hot xylene soluble mass ratio at 105° C. for the composite material is taken as Gb (%), and an cellulose effective mass ratio is taken as Gc (%), a term: Ga−Gb corresponds to a mass ratio (%) of polypropylene and Gb corresponds to a mass ratio (%) of polyethylene. Accordingly, the composite material of the present invention also preferably satisfies the following formula:

$$\{(Ga-Gb)/(Gb+Gc)\}\times 100 \leq 20$$

where, $$Ga=\{(W0-Wa)/W0\}\times 100,$$

$$Gb=\{(W0-Wb)/W0\}\times 100,$$

where, W0 denotes mass of a composite material before being immersed into hot xylene, Wa denotes mass of a composite material after being immersed into hot xylene at 138° C. and then drying and removing xylene, and Wb denotes mass of a composite material after being immersed into hot xylene at 105° C. and then drying and removing xylene, $$Gc=\{Wc/W00\}\times 100,$$

where,

Wc denotes an amount of mass reduction of a dry composite material while a temperature is raised from 270° C. to 390° C. in a nitrogen atmosphere, and W00 denotes mass of a dry composite material before a temperature is raised (at 23° C.) as described above.

At least a part of the polyethylene resin and/or the polypropylene forming the composite material of the present invention is preferably derived from a recycled material. Specific examples of the recycled material include the cellulose-fiber adhesion polyethylene thin film piece, the polyethylene laminated paper having the paper and the polyethylene thin film layer, the beverage pack and/or the food pack each formed of the polyethylene laminated paper having the paper and the polyethylene thin film layer, and the like, as described above.

The composite material of the present invention is preferably obtained by using, as the raw material:

(a) the polyethylene laminated paper having the paper and the polyethylene thin film layer; and/or (b) the beverage pack and the food pack each formed of the laminated paper having the paper and the polyethylene thin film layer.

More specifically, the composite material is preferably obtained by using, as the raw material, the cellulose-fiber adhesion polyethylene thin film piece obtained by stripping off and removing, by using the pulper, the paper portion by treating the laminated paper and/or the beverage pack and the food pack as described above. More specifically, the composite material is preferably obtained by providing the cellulose-fiber adhesion polyethylene thin film piece for melt kneading treatment to be mentioned later in the presence of water.

The composite material of the present invention may contain an inorganic material. Flexural modulus and flame retardancy may be improved by containing the inorganic material. From viewpoints of flexural modulus and the impact characteristics, a preferable content of the inorganic material based on 100 parts by mass of the polyethylene resin is 1 to 100 parts by mass. If the flame retardancy is taken into consideration, and the impact characteristics are further taken into consideration, a preferable content of the inorganic material based on 100 parts by mass of the polyethylene resin is preferably 5 to 40 parts by mass.

Specific examples of the inorganic material include calcium carbonate, talc, clay, magnesium oxide, aluminum hydroxide, magnesium hydroxide and titanium oxide. Above all, calcium carbonate is preferable. As the inorganic material, when the composite material is obtained by adding, to the cellulose-fiber adhesion polyethylene thin film piece mentioned above, paper sludge, waste paper, a laminated paper waste material, or the like, and kneading the resulting material in the presence of water, the inorganic material may be derived from a filler material originally contained in the paper sludge, the waste paper and the laminated paper waste material.

The composite material of the present invention may contain a flame retardant, an antioxidant, a stabilizer, a weathering agent, a compatibilizer, an impact improver, a modifier, or the like according to the purpose.

Specific examples of the flame retardant include a phosphorus type flame retardant, a halogen type flame retardant and metal hydroxide as mentioned above. In order to improve the flame retardancy, the composite material may contain a resin such as an ethylene-based copolymer including an ethylene-vinyl acetate copolymer and an ethyl acrylate copolymer.

Examples of the phosphorus type flame retardant include a compound containing a phosphorus atom in a molecule, and specific examples include red phosphorus, phosphorous oxide such as phosphorus trioxide, phosphorus tetroxide and phosphorus pentoxide, a phosphoric acid compound such as phosphoric acid, phosphorous acid, hypophosphoric acid, metaphosphoric acid, pyrophosphoric acid and polyphosphoric acid, ammonium phosphate such as monoammonium phosphate, diammonium phosphate and ammonium polyphosphate, melamine phosphate such as melamine monophosphate, melamine diphosphate and melamine polyphosphate, phosphoric acid salts such as sodium phosphate, potassium phosphate and calcium phosphate, aliphatic phosphoric acid esters and aromatic phosphoric acid esters.

Specific examples of the halogen type flame retardant include aliphatic or alicyclic hydrocarbon bromide such as hexabromocyclododecane, aromatic compound bromide such as hexabromobenzene, ethylenebispentabromodiphenyl and 2,3-dibromopropylpentabromo phenyl ether, brominated bisphenols and a derivative thereof, a brominated bisphenols derivative oligomer, a bromide type aromatic compound, chlorinated paraffin, chlorinated naphthalene, a chlorinated aromatic compound, a chlorinated alicyclic compound, and a bromide type flame retardant such as hexabromophenyl ether and decabromodiphenyl ether.

Specific examples of the metal hydroxide include magnesium hydroxide and aluminum hydroxide. The metal hydroxide may be a material obtained by applying surface treatment to the metal hydroxide described above or a material without applying the surface treatment thereto.

Specific examples of the antioxidant, the stabilizer and the weathering agent include a hindered phenol antioxidant such as tetrakis[methylene-3-(3,5-di-t-butyl-4-hydroxyphenyl)propionate]methane, 1,3,5-trimethyl-2,4,6-tris(3,5-di-t-butyl-4-hydroxybenzyl)benzene and 4,4'-thiobis(3-methyl-6-t-butylphenol), and a hindered amine compound such as polymethylpropyl 3-oxy-[4(2,2,6,6tetramethyl)piperidinyl]siloxane, polyester of 4-hydroxy-2,2,6,6-tetramethyl-1-piperidineethanol and succinic acid, poly[{6-(1,1,3,3-tetramethylbutyl)amino-1,3,5-triazine-2,4-diyl}{(2,2,6,6-tetramethyl-4-piperidyl)imino}hexamethylene{(2,2,6,6-tetramethyl-4-piperidyl)imino}].

A preferable content of the antioxidant, the stabilizer or the weathering agent is 0.001 part by mass to 0.3 part by mass, each based on 100 parts by mass of the composite material, and is appropriately preferably adjusted depending on a kind of the antioxidant, the stabilizer or the weathering agent and an application of the composite material.

Specific examples of the compatibilizer, the impact improver and the modifier include a styrene-based elastomer such as polystyrene-poly(ethylene-ethylene/propylene) block-polystyrene, polystyrene-poly(ethylene/butylene) block-polystyrene, polystyrene-poly(ethylene/propylene) block-polystyrene and an olefin crystalline ethylene-butylene-olefin crystalline block polymer, acid-modified polyolefin such as maleic acid-modified polyethylene and maleic acid-modified polypropylene. In view of enhancing the tensile strength and the flexural strength, maleic acid-modified polyethylene can be preferably used.

The composite material of the present invention can contain an oil component or various additives for improving processability. Specific examples thereof include paraffin, modified polyethylene wax, stearate, hydroxy stearate, a vinylidene fluoride-based copolymer such as a vinylidene fluoride-hexafluoropropylene copolymer, and organic-modified siloxane.

The composite material of the present invention may contain carbon black, and various pigments and dyes.

The composite material of the present invention can contain an electrical conductivity-imparting component such as electrically conductive carbon black and metal.

The composite material of the present invention can contain thermal conductivity-imparting component such as metal.

The composite material of the present invention may be a foam. That is, the composite material of the present invention may be a material prepared by incorporating a foaming agent thereinto and foaming the agent. Examples of the foaming agent include an organic or inorganic chemical foaming agent, and specific examples include azodicarbonamide.

The composite material of the present invention may be crosslinked.

Examples of the crosslinking agent include organic peroxide, and specific examples include dicumyl peroxide. The composite material of the present invention may be in a crosslinked form by a silane crosslinking method.

A linear expansion coefficient of the composite material of the present invention is preferably $1 \times 10^{-4}$ or less. If the linear expansion coefficient is $1 \times 10^{-4}$ or less, a formed body excellent in dimensional stability is obtained.

The above-described linear expansion coefficient is measured by shaping the composite material into a specific shape. More specifically, linear expansion coefficient is measured by the method described in Examples mentioned later.

The formed body of the present invention is formed by using the cellulose-fiber dispersion polyethylene resin composite material of the present invention. In the formed body of the present invention, the cellulose fibers are dispersed in the polyethylene resin in a sufficiently uniform state, and therefore the formed body is high in homogeneity, and excellent in the shape stability, and simultaneously excellent in the flexural strength, the impact resistance and the like, and therefore can be used in multipurpose applications.

The formed body can be obtained by a forming method such as injection molding and extrusion molding by directly using the composite material of the present invention or after melt kneading the composite material.

The formed body of the present invention can also be used in a pellet form or as a forming material. The pellet of the present invention is formed of the above-described formed or a cut material thereof.

The composite material or the pellet of the present invention can be processed into the formed body by being mixed with a polyolefin resin such as high density polyethylene and polypropylene, and forming this mixture. This formed body can be obtained by the above-mentioned forming method by directly using or after kneading the composite material or the pellet of the present invention, and the polyolefin resin such as high density polyethylene and polypropylene, for example. The thus obtained formed body has excellent mechanical characteristics such as high tensile strength, high flexural strength and high flexural modulus, or excellent thermal characteristics such as a low linear expansion coefficient and high thermal conductivity. That is, the present invention can provide the obtained formed body with excellent mechanical characteristics such as high tensile strength, high flexural strength and high flexural modulus, or excellent thermal characteristics such as a low linear expansion coefficient and high thermal conductivity by kneading the composite material or the pellet of the present invention with high density polyethylene or polypropylene. Moreover, the formed body in which the composite material or the pellet of the present invention is mixed with polyolefin such as high density polyethylene or polypropylene has excellent waterproof characteristics such as low water absorbing properties.

Thus, the composite material or the pellet of the present invention can be used as a modified masterbatch containing the cellulose fiber for the polyolefin resin such as high density polyethylene and polypropylene. When the composite material or the pellet is used as the modified masterbatch, as a content of the cellulose fiber in the composite material or the pellet of the present invention, a proportion of the cellulose fiber is preferably 25 parts by mass or more, further preferably 35 parts by mass or more, and still further preferably 45 parts by mass or more, in the total content of 100 parts by mass of the polyethylene resin and the cellulose fiber.

{Recycling Method for a Cellulose-Fiber Adhesion Polyethylene Thin Film Piece}

The recycling method for the cellulose-fiber adhesion polyethylene thin film piece of the present invention includes obtaining the cellulose-fiber dispersion polyethylene resin composite material by the above-mentioned production method for the cellulose-fiber dispersion polyethylene resin composite material. This recycling method preferably includes consecutively performing the following steps (A) and (B) in this order:

(A) a step of providing a cellulose-fiber adhesion polyethylene thin film piece containing water for volume reduction treatment, (B) a step of obtaining a cellulose-fiber dispersion polyethylene resin composite material by melt kneading, in the presence of water in a subcritical state, the cellulose-fiber adhesion polyethylene thin film piece containing the water subjected to the volume reduction treatment.

The above-described recycling method preferably includes further performing the following step (C) before performing the step (A). When the method includes the step (C), the above-described recycling method becomes the recycling method for the polyethylene laminated paper:

(C) a step of obtaining a water-containing cellulose-fiber adhesion polyethylene thin film piece by stripping off and removing a paper portion by agitating, in water, the polyethylene laminated paper in which a polyethylene thin film is attached on a surface of paper.

The step (C) is typically the step of striping off and removing the paper portion from laminated paper by agitating the laminated paper in water (in water or in hot water) for a long time in a device called a pulper, as mentioned above. Such a step can employ a conventionally publicly-known step in recycling polyethylene laminated paper.

In the cellulose-fiber adhesion polyethylene thin film piece obtained in the step (C), the moisture content ordinarily reaches around 50% by mass, and the thin film piece is in a state in which a large amount of water is absorbed. Such a cellulose-fiber adhesion polyethylene thin film piece is provided for the volume reduction treatment in the step (A). The moisture is squeezed by the volume reduction treatment, and the moisture content generally reaches around 20% by mass. Moreover, an apparent volume is preferably adjusted to ½ to ⅕ by this volume reduction treatment. The device used in the volume reduction treatment is not particularly limited, but DUAL PRETISER (model: DP-3N, manufactured by Oguma Iron Works Co., Inc.) or the like can be used, for example.

The cellulose-fiber dispersion polyethylene resin composite material is obtained by melt kneading, in the presence of water in the subcritical state, the water-containing cellulose-fiber adhesion polyethylene thin film piece through the step (A). As this melt kneading in the presence of water, a form of the melt kneading described in the production method for the cellulose-fiber dispersion polyethylene resin composite material of the present invention can be employed, and a preferable form is also the same.

The energy efficiency or the cost of the recycling can be significantly improved by the recycling method according to the above-described consecutive steps, for example, elimination of necessity of purposely conveying, to another plant, the cellulose-fiber adhesion polyethylene thin film piece which is separated from the polyethylene laminated paper and contains a large amount of water to gain weight.

According to such a recycling method, the cellulose-fiber adhesion polyethylene thin film piece which is separated from used polyethylene laminated paper, and currently only disposed of or recycled as a fuel can be recycled, with high energy efficiency, to the cellulose-fiber dispersion polyethylene resin composite material with high quality.

According to the recycling method of the present invention, in order to prepare the composite material having a higher function or to expand the field of utilization of the composite material, for example, low density polyethylene and/or linear low density polyethylene, or high density polyethylene and the like may be added thereto, and kneaded together with the cellulose-fiber adhesion polyethylene thin film piece.

[Production Method for a Formed Body]

The production method for the formed body of the present invention is not particularly limited as long as the cellulose-fiber dispersion polyethylene resin composite material or the pellet described above is used therein. The production method for the formed body of the present invention includes mixing the cellulose-fiber dispersion polyethylene resin composite material or the above-described pellet with at least any one of high density polyethylene and polypropylene, and forming the mixture, and obtaining the formed body. As the forming method, the above-mentioned method can be used.

EXAMPLES

The present invention will be described in more detail based on examples given below, but the invention is not meant to be limited by these.

First, a measurement method and an evaluation method for each indicator in the present invention will be described.

[Melt Flow Rate (MFR)]

A melt flow rate was measured under conditions: temperature=230° C., and load=5 kgf in accordance with JIS K 7210. A unit of MFR is g/10 min. {0082}

[Shape of Resulting Material (Cellulose-Fiber Dispersion Polyethylene Resin Composite Material)]

An appearance of a cellulose-fiber dispersion polyethylene composite material after kneading was evaluated through visual inspection. A material in a state of bulk was deemed as a conformance product (○); and a material in a powder shape having a particle size of 2 mm or less, or a material which was significantly ignited after kneading was deemed as a nonconformance product (x). The material in the powder shape causes bridging or adhesion to a vessel wall surface for the reason of easily absorbing moisture in air due to small bulk density, and is difficult in charging into a forming machine by self-weight fall upon subsequent forming.

In the present Example, all composite materials obtained by the production method of the present invention fall under the above-described conformance product.

[Moisture Content]

A moisture content is a weight loss (% by mass) upon performing a thermogravimetric analysis (TGA) from 23° C. to 120° C. at a heating rate of +10° C./min under a nitrogen atmosphere within 6 hours after production.

[Power Consumption]

When a cellulose-fiber dispersion polyethylene resin composite material was continuously prepared from a cellulose-fiber adhesion polyethylene thin film piece which absorbed water, a total of electric energy consumed by each device (a dryer, a volume reduction machine or a kneader) until 1 kg of the composite material was produced was determined.

[Impact Resistance]

A test piece (thickness: 4 mm, width: 10 mm, and length: 80 mm) was prepared by injection molding, and Izod impact strength was measured using a notched test piece in accordance with JIS K 7110. A unit of the impact resistance is kJ/m$^2$.

[Flexural Strength]

A test piece (thickness: 4 mm, width: 10 mm, and length: 80 mm) was prepared by injection molding. A load was applied to the test piece with a span of 64 mm, a curvature radius of 5 mm at a supporting point and an action point, and a test speed of 2 mm/min, and flexural strength was calculated in accordance with JIS K 7171. A unit of the flexural strength is MPa.

[Linear Expansion Coefficient]

A linear expansion coefficient was determined in accordance with JIS K 7197.

A formed body having a thickness of 4 mm, a width of 10 mm and a length of 80 mm was obtained by injection molding. An injection direction of the resin at this time was a longitudinal direction. From this formed body, a quadratic prism-shaped test piece having a depth of 4 mm, a width of 4 mm and a height of 10 mm was cut out in such a manner that the longitudinal direction corresponds to a height direction.

TMA measurement was performed by using the test piece obtained, by using TMA 8310 manufactured by Rigaku Corporation, in the temperature range of −50 to 100° C., at a load of 5 g (49 mN); and in a nitrogen atmosphere. A heating rate at this time was 5° C./min. In addition, a temperature of the test piece was once raised to 100° C. being an upper limit temperature of the test range this time before obtaining data to relax strain caused by forming. From a TMA curve obtained, average linear expansion coefficients in the temperature range of 10° C. to 30° C. were determined.

[Water Absorption Ratio]

A composite material which was dried by a hot air dryer at 80° C. in advance until a moisture content was reduced to 0.5% by mass or less was shaped into a sheet form having a dimension of 100 mm×100 mm×1 mm by a press to obtain a formed body, and this formed body, was immersed into water at 23° C. for 20 days, and based on measured values before and after the immersion, water absorption ratio was determined according to the following formula [Formula A] (in which, upon measuring mass after the immersion, water drops adhered on the surface was wiped off with dry cloth or filter paper). With regard to conformance or nonconformance, a case where calculated water absorption ratio satisfies the following evaluation formula [Formula B] was deemed as conformance (○), and a case where the calculated water absorption does not satisfy the formula was deemed as nonconformance (×).

(Water absorption ratio [%])=(mass after immersion [g]−mass before immersion [g])×100/(mass before immersion [g])  [Formula A]

(Water absorption ratio)<(cellulose effective mass ratio)$^2$×0.01  [Formula B]

The cellulose effective mass ratio was calculated, based on the results obtained by performing a thermogravimetric analysis (TGA) from 23° C. to 400° C. at a heating rate of +10° C./min under a nitrogen atmosphere by using a sample (10 mg) adjusted to a dry state by drying the sample at 80° C. for one hour in an ambient atmosphere in advance, according to the following formula. The measurement was performed five times to determine an average thereof, and the average was taken as the cellulose effective mass ratio.

(Cellulose effective mass ratio [%])=(mass loss [mg] from 270° C. to 390° C.)×100/(mass [mg] of sample)

{Impact Resistance Retention after Water Absorption}

A test piece (thickness: 4 mm, width: 10 mm, and length: 80 mm, notched) was prepared by injection molding, and this test piece was immersed into water at 23° C. for 20 days, and based on measured values of impact resistance before and after immersion as measured in accordance with JIS K 7110, impact resistance retention after water absorption was calculated according to the following formula (in which, upon measuring the impact resistance after immersion, measurement was performed without drying the test piece intentionally, within 6 hours after removing the test piece from water).

(Impact resistance retention [%] after water absorption)=(Impact resistance [kJ/m$^2$] after water absorption)×100/(Impact resistance [kJ/m$^2$] before water absorption)

{Cellulose-Fiber Dispersibility}

A composite material which was dried by a hot air dryer at 80° C. in advance until a moisture content was reduced to 0.5% by mass or less was shaped into a sheet form having a dimension of 100 mm×100 mm×1 mm by a press to obtain a formed body. This formed body was immersed into water at 80° C. for 20 days, and then a square having a size of 40 mm×40 mm was drawn in an arbitrary place on a surface of the formed body removed from warm water, and further 9 line segments having a length of 40 mm were drawn inside the square at an interval of 4 mm. Roughness on an intermediate line between adjacent two line segments was measured under conditions of cut-off value λc=8.0 mm and λs=25.0 μm by using a surface roughness measuring instrument to obtain 10 lines of roughness curves (specified by JIS B 0601; evaluation length: 40 mm). When the number of mountains having a peak top of 30 μm or more and being convex upward (from the surface toward an outside) is counted in all of 10 lines of the roughness curves, a case where the number of mountains is 20 or more in total was deemed as a nonconformance product (x), and a case where the number of mountains is less than 20 was deemed as a conformance product (○).

When the cellulose fibers are unevenly distributed in the sample, water absorption is locally caused, and the surface in the portion swells, and therefore cellulose fiber dispersibility can be evaluated by this method.

{Molecular Weight Pattern}

To 16 mg of composite material, 5 mL of a solvent (1,2,4-trichlorobenzene) for GPC measurement was added, and the resulting mixture was stirred at 160° C. to 170° C. for 30 minutes. An insoluble matter was removed by filtration with a metal filter having a pore of 0.5 μm, and GPC was measured on the thus obtained sample (soluble matter) after filtration by using a GPC system (PL220, manufactured by Polymer Laboratories, Inc., model: HT-GPC-2), using, as columns, Shodex HT-G (one) and HT-806M (two), setting a column temperature to 145° C., using 1,2,4-trichlorobenzene as an eluant, at a flow rate of 1.0 mL/min, and injecting 0.2 mL of the sample thereinto. Thus, a molecular weight pattern was obtained by using monodisperse polystyrene (manufactured by Tosoh Corporation), and dibenzyl (manufactured by Tokyo Chemical Industry Co., Ltd.) as standard samples to prepare a calibration curve, and performing data processing by a GPC data processing system (manufactured by TRC). In the molecular weight pattern, a pattern satisfying the following relation (A) was deemed as a conformance pattern (○), and a pattern not satisfying the following relation (A) was deemed as a nonconformance pattern (x).

$$1.7 > \text{half-width}(\text{Log}(MH/ML)) > 1.0 \quad (A)$$

Here, the half-width of the molecular weight pattern shows spread of a spectrum (degree of a molecular weight distribution) around a peak top (maximum frequency) of a maximum peak of the molecular weight patterns in GPC. That is, a width of a GPC spectral line in a place (a molecular weight on a high molecular weight side and a molecular weight on a low-molecular weight side are referred to as MH and ML, respectively) in which intensity in the spectrum becomes a half of the peak top (maximum frequency) is taken as the half-width (see FIG. 1). Moreover, when a plurality of peaks are observed, the half-width is calculated from a maximum peak of respective peaks.

{Tensile Strength}

A test piece was prepared by injection molding, and tensile strength was measured on a No. 2 test piece in accordance with JIS K 7113. A unit is MPa.

{Cellulose Fiber Length}

Then, 0.1 to 1 g was cut from a formed sheet of the composite material and taken as a sample, and this sample was wrapped with a 400-mesh stainless steel mesh, and immersed into 100 mL of xylene at 138° C. for 24 hours. Next, the sample was pulled up therefrom, and then the sample was dried in vacuum at 80° C. for 24 hours. Then, 0.1 g of the dry sample was well dispersed into 50 mL of ethanol, was added dropwise to a petri dish, and a part in the range of 15 mm×12 mm was observed with a microscope. A material in which a cellulose fiber having a fiber length of 1 mm or more was observed was deemed as (○), and a material other than (○) was deemed as (x).

Test Example 1

A test was conducted on an influence of an amount of water when a cellulose-fiber adhesion polyethylene thin film piece was kneaded by using a batch type closed kneading device.

A cellulose-fiber adhesion polyethylene thin film piece was obtained by stripping off and removing, by using a pulper, a paper portion from a used beverage container made of paper as formed of polyethylene laminated paper. This thin film piece was cut into small pieces having various shapes and sizes of about several cm$^2$ to 100 cm$^2$, and was in a wet state (state in which a large amount of water was absorbed) by being immersed into water in a step of stripping off the paper portion. Moreover, a mass ratio (after drying) of polyethylene forming such a thin film piece to a cellulose fiber adhered thereto was {polyethylene}:{cellulose fiber}=56:44.

This cellulose-fiber adhesion polyethylene thin film piece was dried by a dryer set at 80° C. for 48 hours to reduce a moisture content to 1% by mass or less, and then water was intentionally added thereto to prepare four kinds of sample materials so as to satisfy parts by mass of water as described in each column of Examples 1 to 3 and Comparative Example 1 shown in Table 1.

Next, these four kinds of sample materials were separately charged into a batch type closed kneading device (manufactured by M&F Technology Co., Ltd., MF type mixing and melting device, model: MF5008 R/L), and agitated with a high speed by adjusting a peripheral speed at a leading edge of an agitation blade of the mixing and melting device to 40 m/sec to turn water into a subcritical state, and simultaneously the sample materials were kneaded to prepare four kinds of cellulose-fiber dispersion polyethylene resin composite materials.

In addition, unless otherwise specified, with regard to a kneading end time point by using the batch type closed kneading device in each Test Example, rotating torque of a rotary shaft of the batch type closed kneading device rises and reaches a maximum value and then falls, and then a torque change is reduced, and therefore a time point at which a torque change rate reaches 5% or less per second is taken as a starting point is defined as a moment at which the torque reached a minimum value, and an elapsed time from this starting point was adjusted to 7 seconds.

The results of evaluation of each composite material are as shown in Table 1.

TABLE 1

| | Example 1 | Example 2 | Example 3 | Comparative Example 1 |
|---|---|---|---|---|
| Cellulose fiber (parts by mass) | 44 | 44 | 44 | 44 |
| Polyethylene (parts by mass) | 56 | 56 | 56 | 56 |
| Water (parts by mass) | 8 | 50 | 120 | 0 |
| MIR (g/10 min) | 1.8 | 1.8 | 1.7 | — |
| Shape of resulting material | ○ | ○ | ○ | x |
| Moisture content (% by mass) | 0.2 | 0.2 | 0.2 | 0.2 |
| Power consumption (kWh/kg) | 0.7 | 1.0 | 1.3 | 0.3 |
| Impact resistance (kJ/m$^2$) | 5.7 | 6.1 | 6.5 | — |
| Flexural strength (MPa) | 30.2 | 31 | 30.9 | — |
| Water absorption ratio (%) | 8.1 | 7.9 | 7.7 | — |
| Conformance or nonconformance of water absorption ratio | ○ | ○ | ○ | — |
| Impact resistance retention (%) after water absorption | 107 | 107 | 107 | — |
| Cellulose fiber dispersibility | ○ | ○ | ○ | — |
| Molecular weight pattern | ○ | ○ | ○ | — |

Comparative Example 1 in Table 1 shows that, when the melt kneading of the cellulose-fiber adhesion polyethylene thin film piece was performed in a water-free environment, the cellulose-fiber dispersion polyethylene resin composite material of the present invention is unable to be obtained.

Moreover, Example 1 shows that, even though the amount of water is as small as 8:100 in the mass ratio of water to the cellulose-fiber adhesion polyethylene thin film piece, the cellulose-fiber dispersion polyethylene resin composite material having excellent characteristics can be obtained. Moreover, Example 3 shows that, even though the amount of water is as significantly large as 120:100 in the mass ratio of water to the cellulose-fiber adhesion polyethylene thin film piece, the cellulose-fiber dispersion polyethylene resin composite material having excellent characteristics is obtained, and the moisture content can be reduced. Accordingly, the production method of the present invention in which the melt kneading is performed in the presence of water in the subcritical state shows that presence of water is important during the melt kneading, and the amount of water may be large or small. If energy efficiency is taken into consideration, the amount of water is recommended to be not excessively large.

Test Example 2

An examination was conducted on a relationship between a melt flow rate (MFR) and other characteristics of a composite material obtained by kneading a cellulose-fiber adhesion polyethylene thin film piece by using a batch type closed kneading device.

A cellulose-fiber adhesion polyethylene thin film piece was obtained in the same manner as in the Example 1 described above. Such a thin film piece was cut into small pieces of about several $cm^2$ to 100 $cm^2$, and was in a wet state in the same way as in the Example 1. Moreover, a mass ratio (after drying) of polyethylene forming the thin film piece to a cellulose fiber adhered thereto was: {polyethylene}:{cellulose fiber}=52:48 for Example 4, {polyethylene}:{cellulose fiber}=56:44 for Example 5, and {polyethylene}:{cellulose fiber}=58:42 for Example 6 and Example 7. The cellulose-fiber adhesion polyethylene thin film piece was dried by a dryer set at 80° C. for 48 hours to reduce a moisture content to 1% by mass or less, and then water was intentionally added thereto, and water was adjusted to be 50 parts by mass based on a total amount of 100 parts by mass of the cellulose fiber and the polyethylene.

Next, these four kinds of cellulose fiber adhesion polyethylene thin film pieces were separately charged into the batch type closed kneading device same with the device in Example 1 with keeping a wet state, and agitated with a high speed to turn water into a subcritical state, and simultaneously the sample materials were kneaded, and the kneading was stopped at a place where the melt flow rate of each sample material exhibited the value described in Table 2 to prepare four kinds of cellulose-fiber dispersion polyethylene resin composite materials.

The results of evaluation of each composite material are listed in Table 2.

TABLE 2

|  | Example 4 | Example 5 | Example 6 | Example 7 |
|---|---|---|---|---|
| Cellulose fiber (parts by mass) | 48 | 44 | 42 | 42 |

TABLE 2-continued

|  | Example 4 | Example 5 | Example 6 | Example 7 |
|---|---|---|---|---|
| Polyethylene (parts by mass) | 52 | 56 | 58 | 58 |
| MFR (g/10 min) | 0.5 | 1.8 | 8.3 | 15 |
| Shape of resulting material | ○ | ○ | ○ | ○ |
| Moisture content (% by mass) | 0.2 | 0.2 | 0.2 | 0.2 |
| Power consumption (kWh/kg) | 1.0 | 1.0 | 1.0 | 1.1 |
| Impact resistance (kJ/$m^2$) | 5.2 | 6.1 | 11.2 | 2.1 |
| Flexural strength (MPa) | 33.5 | 31 | 20.1 | 13.1 |
| Water absorption ratio (%) | 8.9 | 8.1 | 7.5 | 7.8 |
| Conformance or nonconformance of water absorption ratio | ○ | ○ | ○ | ○ |
| Impact resistance retention (%) after water absorption | 110 | 107 | 104 | 100 |
| Cellulose fiber dispersibility | ○ | ○ | ○ | ○ |
| Molecular weight pattern | ○ | ○ | ○ | ○ |

The results in Table 2 show that, even if the MFR is changed, the characteristics of the composite material obtained are satisfactory. However, in Example 7, MFR was over 10, and the composite material resulted in somewhat poor impact resistance strength, but still had sufficient impact resistance.

Test Example 3

A test was conducted on an influence of time during which the cellulose-fiber adhesion polyethylene thin film piece was kneaded by using a batch type closed kneading device.

A cellulose-fiber adhesion polyethylene thin film piece was obtained in the same manner as in the Example 1 described above. Such a thin film piece was cut into small pieces of about several $cm^2$ to 100 $cm^2$, and was in a wet state in the same way as in the Example 1. Moreover, a mass ratio (after drying) of polyethylene forming this thin film piece to a cellulose fiber adhered thereto was: {polyethylene}:{cellulose fiber}=56:44. In this thin film piece in the wet state, an amount of water adhered thereto was about 50 parts by mass based on a total amount of 100 parts by mass of the cellulose fiber and the polyethylene.

Next, this cellulose-fiber adhesion polyethylene thin film piece was charged into the batch type closed kneading device same with the device in Example 1 with keeping the wet state, and agitated with a high speed to turn water into a subcritical state, and simultaneously melt kneaded to prepare six kinds of cellulose-fiber dispersion polyethylene resin composite materials in which kneading time periods were changed.

Specifically, the composite material was prepared in such a manner that, rotating torque of a rotary shaft of the batch type closed kneading device rises and reaches a maximum value and then falls, and then a torque change is reduced, and therefore a time point at which a torque change rate reaches 5% or less per second is taken as a starting point is defined as a moment at which the torque reached a minimum value, and as an elapsed time from this starting point until the device is stopped (corresponding to "Time A" in Table 2), "Time A" shown in Table 3 is satisfied.

The results of evaluation of each sample are as listed in Table 3.

TABLE 3

|  | Example 8 | Example 9 | Example 10 | Example 11 | Example 12 |
|---|---|---|---|---|---|
| Cellulose fiber (parts by mass) | 44 | 44 | 44 | 44 | 44 |
| Polyethylene (parts by mass) | 56 | 56 | 56 | 56 | 56 |
| Time A (sec) | 0 | 5 | 10 | 30 | 60 |
| MIR(g/10 min) | 1.5 | 1.5 | 2.8 | 8.5 | 12 |
| Shape of resulting material | ○ | ○ | ○ | ○ | ○ |
| Moisture content (% by mass) | 0.2 | 0.2 | 0.2 | 0.2 | 0.2 |
| Power consumption (kWh/kg) | 1.0 | 1.0 | 1.0 | 1.0 | 1.1 |
| Impact resistance (kJ/m$^2$) | 6.3 | 6.9 | 6.1 | 4.5 | 3.3 |
| Flexural strength (MPa) | 27.7 | 29 | 31 | 22.3 | 20.9 |
| Water absorption ratio (%) | 8.1 | 7.9 | 7.8 | 7.5 | 7.7 |
| Conformance or nonconformance of water absorption ratio | ○ | ○ | ○ | ○ | ○ |
| Impact resistance retention (%) after water absorption | 107 | 106 | 106 | 107 | 107 |
| Cellulose fiber dispersibility | ○ | ○ | ○ | ○ | ○ |
| Molecular weight pattern | ○ | ○ | ○ | ○ | ○ |

Table 3 shows that MFR of the composite material to be obtained can be changed by adjusting "Time A" and the composite material having different physical properties can be obtained. However, in Example 12, MFR was over 10 because "Time A" was long, and the composite material resulted in somewhat poor impact resistance strength, but still had sufficient impact resistance.

Further, FIG. 1 shows a half-width of a molecular weight pattern in Example 10. In FIG. 1, a horizontal axis represents a molecular weight, and a vertical axis represents a weight fraction per unit log M: (dW/d log M) (in which M denotes a molecular weight, and W denotes weight. From the results in FIG. 1, in the molecular weight pattern in Example 10, the half-width is 1.54, which satisfies the provision of the present invention.

Test Example 4

A test was conducted on an influence when a mass ratio of polyethylene of a cellulose-fiber adhesion polyethylene thin film to a cellulose fiber adhered to such a thin film.

Five kinds of cellulose-fiber adhesion polyethylene thin film pieces in which a mass ratio of polyethylene to a cellulose fiber was changed as shown in Table 4 were obtained. These thin film pieces were cut into small pieces of about several cm$^2$ to 100 cm$^2$ and in a wet state for all in the same manner as in Example 1. This cellulose-fiber adhesion polyethylene thin film piece was dried by a dryer set at 80° C. for 48 hours to reduce a moisture content to 1% by mass or less, and then water was intentionally added thereto. Water was adjusted to be 30 parts by mass based on a total amount of 100 parts by mass of the cellulose fiber and the polyethylene for Example 13, and water was adjusted to be 50 parts by mass based on a total amount of 100 parts by mass of the cellulose fiber and the polyethylene for Examples 14 to 16 and Comparative Example 2.

Next, this cellulose-fiber adhesion polyethylene thin film piece was charged into the batch type closed kneading device same with the device in Example 1 with keeping the wet state, and agitated with a high speed to turn water into a subcritical state, and simultaneously melt kneaded to prepare five kinds of cellulose-fiber dispersion polyethylene resin composite materials.

The results of evaluation of each composite material are as shown in Table 4. In addition, in each example, with regard to a kneading end time point by using the batch type closed kneading device, rotating torque of a rotary shaft of the batch type closed kneading device rises and reaches a maximum value and then falls, and then a torque change is reduced, and therefore a time point at which a torque change rate reaches 5% or less per second is taken as a starting point is defined as a moment at which the torque reached a minimum value, and an elapsed time from this starting point was adjusted to 7 seconds.

TABLE 4

|  | Example 13 | Example 14 | Example 15 | Example 16 | Comparative Example 2 |
|---|---|---|---|---|---|
| Cellulose fiber (parts by mass) | 5 | 20 | 37 | 44 | 80 |
| Polyethylene (parts by mass) | 95 | 80 | 63 | 56 | 20 |
| MFR(g/10 min) | 9.2 | 3.1 | 1.8 | 1.5 | — |

TABLE 4-continued

|  | Example 13 | Example 14 | Example 15 | Example 16 | Comparative Example 2 |
|---|---|---|---|---|---|
| Shape of resulting material | ○ | ○ | ○ | ○ | × |
| Moisture content (% by mass) | 0.2 | 0.2 | 0.2 | 0.2 | — |
| Power consumption (kWh/kg) | 0.9 | 1.0 | 1.0 | 1.0 | — |
| Impact resistance (kJ/m²) | 13.2 | 10.6 | 6.3 | 6.1 | — |
| Flexural strength (Ma) | 10.1 | 90.7 | 30.7 | 32.4 | — |
| Tensile strength (Ma) | 13.7 | 21.1 | 25.8 | 26.3 | — |
| Water absorption ratio (%) | 0.1 | 1.7 | 6.9 | 7.9 | — |
| Conformance or nonconformance of water absorption ratio | ○ | ○ | ○ | ○ | — |
| Impact resistance retention (%) after water absorption | 104 | 107 | 107 | 106 | — |
| Cellulose fiber dispersibility | ○ | ○ | ○ | ○ | — |
| Cellulose fiber length | ○ | ○ | ○ | ○ | — |
| Molecular weight pattern | ○ | ○ | ○ | ○ | — |

From Comparative Example 2 in Table 4, if an amount of the cellulose fiber based on total mass of the cellulose fiber and the polyethylene was becomes larger than the provision of the present invention, formability was deteriorated and the composite material having an objective shape was unable to be obtained. In addition, in Comparative Example 2, a material obtained by cutting polyethylene laminated paper from which a paper portion was not removed at all to allow water to absorb therein was used as a sample material.

Test Example 5

A test was conducted on an influence of a method (device) for kneading a cellulose-fiber adhesion polyethylene thin film piece.

A cellulose-fiber adhesion polyethylene thin film piece was obtained in the same manner as in the Example 1 described above. Such a thin film piece was cut into small pieces of about several cm² to 100 cm², and was in a wet state in the same way as in the Example 1. Moreover, a mass ratio (after drying) of polyethylene forming such a thin film piece to a cellulose fiber adhered thereto was: {polyethylene}:{cellulose fiber}=63:37. In this thin film piece in the wet state, an amount of water adhered thereto was about 50 parts by mass based on a total amount of 100 parts by mass of the cellulose fiber and the polyethylene.

This cellulose-fiber adhesion polyethylene thin film piece in the wet state was melt kneaded in the presence of water in a subcritical state by using the above described batch type closed kneading device to prepare a cellulose-fiber dispersion polyethylene resin composite material (Example 17), as shown in Table 5. In addition, in Example 17, with regard to a kneading end time point by using the batch type closed kneading device, rotating torque of a rotary shaft of the batch type closed kneading device rises and reaches a maximum value and then falls, and then a torque change is reduced, and therefore a time point at which a torque change rate reaches 5% or less per second is taken as a starting point is defined as a moment at which the torque reached a minimum value, and an elapsed time from this starting point was adjusted to 7 seconds.

Moreover, a cellulose-fiber adhesion polyethylene thin film piece in a wet state was dried and then melt kneaded using a kneader to prepare a cellulose-fiber dispersion polyethylene resin composite material (Comparative Example 3).

Further, a cellulose-fiber adhesion polyethylene thin film piece in a wet state was directly mold-molded to prepare a cellulose-fiber dispersion polyethylene resin composite material (Comparative Example 4).

The evaluations described in Table 5 were performed by using these composite materials.

Further, the evaluations described in Table 5 were performed by using a commercially available recycled resin (PE-rich product, manufactured by Green Loop, Inc., Comparative Example 5) which was recovered and recycled in accordance with the Containers and Packaging Recycling Law.

The results of evaluation of each composite material are as shown in Table 5.

TABLE 5

|  | Example 17 | Comparative Example 3 | Comparative Example 4 | Comparative Example 5 |
|---|---|---|---|---|
| Cellulose fiber (parts by mass) | 37 | 37 | 37 | 0 |
| Polyethylene (parts by mass) | 63 | 63 | 63 | 100 |

TABLE 5-continued

| | Example 17 | Comparative Example 3 | Comparative Example 4 | Comparative Example 5 |
|---|---|---|---|---|
| Kneading method | Batch type closed kneading device (subcritical) | Kneader | Mold-molding | Twin screw extruder |
| MFR (g/10 min) | 1.8 | 1.6 | 1.2 | 8.8 |
| Shape of resulting material | ○ | ○ | ○ | ○ |
| Moisture content (% by mass) | 0.2 | 0.2 | 8 | 0.2 |
| Power consumption (kWh/kg) | 1.0 | 2.5< | 0.3 | — |
| Impact resistance (kJ/m$^2$) | 6.3 | 3.5 | 4.1 | 8.7 |
| Flexural strength (MPa) | 30.7 | 30.4 | 30.1 | 17.2 |
| Linear expansion coefficient (10-30° C.) | $3.8 \times 10^{-5}$ | — | — | $1.4 \times 10^{-4}$ |
| Water absorption ratio (%) | 6.9 | 11.2 | 12.0 | 1.1 |
| Conformance or nonconformance of water absorption ratio | ○ | × | × | × |
| Impact resistance retention (%) after water absorption | 107 | 110 | 102 | 101 |
| Cellulose fiber dispersibility | ○ | × | × | — |
| Molecular weight pattern | ○ | × | × | — |

Example 17 in Table 5 shows that the cellulose-fiber dispersion polyethylene resin composite material obtained by melt kneading the thin film piece in the presence of water in the subcritical state in the same manner as in the Example 1 is excellent in a moisture content, impact resistance, water absorption ratio and cellulose fiber dispersibility. Moreover, in Example 17, the molecular weight pattern of the polyethylene resin satisfies a preferable range in the present invention. Thus, it is considered that compatibility between the polyethylene and the cellulose fiber is improved, causing reduction of fine voids in an interface between the polyethylene and the cellulose fiber to improve vulnerability of the interface, and to suppress reduction of impact resistance and an increase of water absorption ratio. Moreover, with regard to the composite material obtained in Example 17, if a cross section thereof was observed with a microscope, a cellulose fiber having a fiber length of 1 mm or more was observed. The composite material obtained in Examples had a low linear expansion coefficient and high dimensional stability.

On the other hand, when the thin film piece subjected to drying treatment was kneaded using the kneader (Comparative Example 3), the drying treatment is required, and therefore total electricity consumption is large for obtaining the composite material. Moreover, the water absorption ratio of the composite material obtained was high and the cellulose fiber dispersibility also was poor.

In a material obtained by directly mold-molding the thin film piece in the wet state (Comparative Example 4), the moisture was unable to be sufficiently removed. Moreover, the composite material obtained had high water absorption ratio and was poor also in the cellulose fiber dispersibility.

Further, it is found that the cellulose-fiber dispersion polyethylene resin composite material produced by the production method of the present invention has improved impact resistance after water absorption in comparison with the commercial available recycled resin (Comparative Example 5).

Test Example 6

A test was conducted on an influence of performing volume reduction and solidification before kneading a cellulose fiber adhesion polyethylene thin film piece.

A cellulose-fiber adhesion polyethylene thin film piece was obtained in the same manner as in the Example 1 described above. Such a thin film piece was cut into small pieces of about several cm$^2$ to 100 cm$^2$, and was in a wet state in the same way as in the Example 1. Moreover, a mass ratio (after drying) of polyethylene forming such a thin film piece to a cellulose fiber adhered thereto was: {polyethylene}:{cellulose fiber}=63:37. In this thin film piece in the wet state, an amount of water adhered thereto was about 50 parts by mass based on a total amount of 100 parts by mass of the cellulose fiber and the polyethylene.

Next, as shown in Table 6, this thin film piece was melt kneaded in the presence of water in a subcritical state by using the batch type closed kneading device same with the device in Example 1 to prepare a cellulose-fiber dispersion polyethylene resin composite material (Example 18).

Moreover, the cellulose-fiber adhesion thin film piece was volume-reduced and solidified using a volume-reduction and solidifying device (manufactured by Oguma Iron Works Co., Inc., DUAL PRETISER, model: DP-3N) before charging the cellulose-fiber adhesion thin film piece into the batch type closed kneading device, and then charging the thin film piece into the batch type closed kneading device (Example 19). An amount of water adhered thereto after the volume reduction treatment was about 12 parts by mass.

Further, the cellulose-fiber adhesion polyethylene thin film piece was dried by a dryer set at 80° C. to reduce a moisture content to be less than 1% by mass before charging the thin film piece into a twin screw extruder (manufactured by Japan Steel Works, Ltd., use of TEX30,), and then was charged into the twin screw extruder (Comparative Example 7).

The results of evaluation of each composite material are as shown in Table 6.

TABLE 6

|  | Example 18 | Example 19 | Comparative Example 7 |
|---|---|---|---|
| Cellulose fiber (parts by mass) | 37 | 37 | 37 |
| Polyethylene (parts by mass) | 63 | 63 | 63 |
| Volume reduction treatment | Not conducted | Conducted | Not conducted |
| Drying treatment | Not conducted | Not conducted | Conducted |
| Kneading method | Batch type closed kneading device (subcritical) | Batch type closed kneading device (subcritical) | Twin screw extruder |
| MFR (g/10 min) | 1.8 | 1.6 | 1.4 |
| Shape of resulting material | ○ | ○ | ○ |
| Moisture content (% by mass) | 0.2 | 0.2 | 0.2 |
| Power consumption (kWh/kg) | 1.0 | 0.6 | 2.6 |
| Impact resistance (kJ/m$^2$) | 6.3 | 6.0 | 6.1 |
| Flexural strength (MPa) | 30.7 | 31.2 | 30.2 |
| Water absorption ratio (%) | 6.9 | 7.1 | 10.4 |
| Conformance or nonconformance of water absorption ratio | ○ | ○ | × |
| Impact resistance retention (%) after water absorption | 107 | 107 | 110 |
| Cellulose fiber dispersibility | ○ | ○ | × |
| Molecular weight pattern | ○ | ○ | × |

Example 18 in Table 6 shows that, in the cellulose-fiber dispersion polyethylene resin composite material obtained by melt kneading the thin film piece in the presence of water in the subcritical state by using batch type closed kneading device, even though the moisture content is 0.2, the power consumption required for the preparation is low and the composite material is excellent in energy efficiency, and excellent in cellulose dispersibility, and is low also in water absorbing properties. Moreover, Example 19 in which the volume reduction treatment was applied thereto before the melt kneading shows that the power consumption can be further significantly reduced.

Further, in Examples 18 and 19, the molecular weight patterns of the polyethylene satisfied the above-described preferable range.

On the other hand, when the thin film piece was kneaded using the twin screw extruder, the moisture content of the composite material obtained was high, the composite material was poor in the cellulose dispersibility, and high in the water absorbing properties. When a kneading method by the twin screw extruder is employed, the moisture content of the composite material obtained can be reduced to a level near 0% by mass by providing the cellulose-fiber adhesion polyethylene thin film piece for drying treatment before kneading the thin film piece. In this case, however, the power consumption was significantly increased to several times, resulted in poor energy efficiency.

Test Example 7

A test was conducted on an influence by adding recycled high density polyethylene (recycled HDPE) in kneading a cellulose-fiber adhesion polyethylene thin film piece.

A cellulose-fiber adhesion polyethylene thin film piece was obtained in the same manner as in the Example 1 described above. Such a thin film piece was cut into small pieces of about several cm$^2$ to 100 cm$^2$, and was in a wet state in the same way as in the Example 1. Moreover, a mass ratio (after drying) of polyethylene forming such a thin film piece to a cellulose-fiber adhered thereto was 63:37. In this thin film piece in the wet state, an amount of water adhered thereto was about 50 parts by mass based on a total amount of 100 parts by mass of the cellulose fiber and the polyethylene.

Next, a predetermined amount of recycled HDPE as shown in Table 7 was added to this thin film piece, and the resulting material was melt kneaded in the presence of water in a subcritical state by using the batch type closed kneading device same with the device in the Example 1 to obtain three kinds of composite materials in Examples 20 to 22.

The results of evaluation of each composite material are as shown in Table 7.

TABLE 7

|  | Example 20 | Example 21 | Example 22 |
|---|---|---|---|
| Cellulose fiber (parts by mass) | 37 | 37 | 37 |
| Polyethylene (parts by mass) | 63 | 63 | 63 |
| Recycled HDPE (parts by mass) | 33 | 100 | 300 |
| MFR (g/10 min) | 1.8 | 4.6 | 9.0 |
| Shape of resulting material | ○ | ○ | ○ |
| Moisture content (% by mass) | 0.2 | 0.2 | 0.2 |
| Power consumption (kWh/kg) | 1.0 | 1.0 | 1.0 |
| Impact resistance (kJ/m$^2$) | 5.6 | 5.8 | 5.8 |
| Flexural strength (MPa) | 27.4 | 24.4 | 22.0 |
| Water absorption ratio (%) | 4.5 | 1.8 | 0.6 |
| Conformance or nonconformance of water absorption ratio | ○ | ○ | ○ |
| Impact resistance retention (%) after water absorption | 107 | 106 | 105 |
| Cellulose fiber dispersibility | ○ | ○ | ○ |

Examples 20 to 22 in Table 7 show that, even if the recycled HDPE was added thereto upon the melt kneading of the cellulose-fiber adhesion polyethylene thin film piece, no problem occurs in terms of physical properties.

Test Example 8

A composite material was produced experimentally using a recovered material of a used beverage container having a different origin as a raw material.

The cellulose-fiber adhesion polyethylene thin film piece was obtained in the same manner as in the Example 1 described above except that the recovered material having the different origin as the used beverage container made of paper was used. This thin film piece was cut into small pieces of about several cm² to 100 cm², and was in a wet state in the same way as in the Example 1. Moreover, a proportion (after drying) of components of an aggregate of this thin film piece is as shown in the Table. In this thin film piece in the wet state, an amount of water adhered thereto based on a total amount of 100 parts by mass of the cellulose fiber and the polyethylene was 50 parts by mass.

Next, this aggregate of the cellulose-fiber adhesion polyethylene thin film piece was charged into the batch type closed kneading device same with the device in the Example 1 with keeping the wet state, and agitated with a high speed to turn water into a subcritical state, and simultaneously melt kneaded to prepare a sample of a cellulose-fiber dispersion polyethylene resin composite material.

In addition, with regard to a kneading end time point using the batch type closed kneading device, rotating torque of a rotary shaft of the batch type closed kneading device rises and reaches a maximum value and then falls, and then a torque change is reduced, and therefore a time point at which a torque change rate reaches 5% or less per second is taken as a starting point is defined as a moment at which the torque reached a minimum value, and an elapsed time from this starting point was adjusted to 7 seconds.

The results of evaluation of each composite material are as shown in Table 8.

TABLE 8

|  | Example 23 | Example 24 |
|---|---|---|
| Cellulose fiber (parts by mass) | 34 | 32 |
| Polyethylene (parts by mass) | 66 | 68 |
| Polypropylene (Rp) (parts by mass) | 16 | 5 |
| polyethylene terephthalate, nylon (parts by mass) | — | 3 |
| Ash (inorganic material) (parts by mass) | — | 9 |
| Shape of resulting material | ○ | ○ |
| Moisture content (% by mass) | 0.2 | 0.2 |
| Power consumption (kWh/kg) | 1.0 | 1.0 |
| Impact resistance (kJ/m²) | 5.3 | 4.1 |
| Flexural strength (MPa) | 28.3 | 26.8 |
| Conformance or nonconformance of waterabsorption ratio | ○ | ○ |
| Impact resistance retention (%) after water absorption | 108 | — |
| Cellulose fiber dispersibility | ○ | ○ |

Rp = (Ga − Gb)/(Gb + Gc) × 100

Table 8 shows that the polyethylene resin composite material in which the cellulose fiber was dispersed as obtained by melt kneading the thin film piece in the presence of water in the same way as in the Example 1 is excellent in a moisture content, impact resistance, water absorption ratio and cellulose fiber dispersibility.

With regard to the cellulose-fiber adhesion polyethylene thin film piece in the state in which, after the polyethylene laminated paper, such as the used beverage container, was provided for treatment by using the pulper or the like to strip off and remove the paper portion, the paper portion which was unable to be completely removed was nonuniformly adhered to the polyethylene resin, and further in the state in which a large amount of water was absorbed, there has so far been no technology for effectively recycling the thin cellulose-fiber adhesion polyethylene film piece as the resin composition, and the thin film piece was landfilled or disposed of just like sort of garbage, or used merely as a fuel. The present invention relates to a technology on treating such a cellulose-fiber adhesion polyethylene thin film piece in an intact state (without needing moisture control or the like) to simply revive the thin film piece as the resin.

Having described our invention as related to the present embodiments, it is our intention that the invention not be limited by any of the details of the description, unless otherwise specified, but rather be construed broadly within its spirit and scope as set out in the accompanying claims.

The invention claimed is:

1. A cellulose-fiber dispersion polyethylene resin composite material, formed by dispersing a cellulose fiber into a polyethylene resin,
    wherein a proportion of the cellulose fiber is 1 part by mass or more and 70 parts by mass or less in a total content of 100 parts by mass of the polyethylene resin and the cellulose fiber, and wherein water absorption ratio and the cellulose effective mass ratio measured by a thermogravimetric analysis (TGA) satisfies the following formula [Formula B];
    and under the condition that the composite material which is dried by a given drying conditions and is shaped into a given sheet form specimen, is immersed into water at 23° C. for 20 days, and water absorption ratio is determined by based on measured values before and after the immersion according to the following [Formula A];

(Water absorption ratio [%])=(mass after immersion [g]−mass before immersion [g])×100/(mass before immersion [g])  [Formula A]

(Water absorption ratio [%])<(cellulose effective mass ratio [%])²×0.01.  [Formula B]

2. The cellulose-fiber dispersion polyethylene resin composite material described in claim 1, wherein a proportion of the cellulose fiber is 5 parts by mass or more and less than 50 parts by mass in the total content of 100 parts by mass of the polyethylene resin and the cellulose fiber.

3. The cellulose-fiber dispersion polyethylene resin composite material described in claim 1,
    wherein a proportion of the cellulose fiber is 25 parts by mass or more and less than 50 parts by mass in the total content of 100 parts by mass of the polyethylene resin and the cellulose fiber, and
    wherein tensile strength of a formed body upon forming the composite material is 20 MPa or more.

4. The cellulose-fiber dispersion polyethylene resin composite material described in claim 1,
    wherein a proportion of the cellulose fiber is 1 part by mass or more and less than 15 parts by mass in the total content of 100 parts by mass of the polyethylene resin and the cellulose fiber, and
    wherein flexural strength of a formed body upon forming the composite material is 8 to 20 MPa.

5. The cellulose-fiber dispersion polyethylene resin composite material described in claim 1,
    wherein a proportion of the cellulose fiber is 15 parts by mass or more and less than 50 parts by mass in the total content of 100 parts by mass of the polyethylene resin and the cellulose fiber, and
    wherein flexural strength of a formed body upon forming the composite material is 15 to 40 MPa.

6. The cellulose-fiber dispersion polyethylene resin composite material described in claim 1, wherein the polyethylene resin satisfies a relationship: 1.7>half-width(Log(MH/ML))>1.0 in a molecular weight pattern obtained by gel permeation chromatography (GPC) measurement.

7. The cellulose-fiber dispersion polyethylene resin composite material described in claim 1, containing a cellulose fiber having a fiber length of 1 mm or more.

8. The cellulose-fiber dispersion polyethylene resin composite material described in claim 1, wherein a melt flow rate (MFR) at a temperature of 230° C. and a load of 5 kgf is 0.05 to 50.0 g/10 min.

9. The cellulose-fiber dispersion polyethylene resin composite material described in claim 1, wherein the polyethylene resin contains low density polyethylene.

10. The cellulose-fiber dispersion polyethylene resin composite material described in claim 1, wherein 50% by mass or more of the polyethylene resin is low density polyethylene.

11. The cellulose-fiber dispersion polyethylene resin composite material described in claim 1, wherein the polyethylene resin contains at least any one of linear low density polyethylene and high density polyethylene.

12. The cellulose-fiber dispersion polyethylene resin composite material described in claim 1, wherein the composite material contains polypropylene, and a content of the polypropylene is 20 parts by mass or less based on the total content of 100 parts by mass of the polyethylene resin.

13. The cellulose-fiber dispersion polyethylene resin composite material described in claim 1, wherein, when a hot xylene soluble mass ratio at 138° C. for the composite material is taken as Ga (%), a hot xylene soluble mass ratio at 105° C. for the composite material is taken as Gb (%), and an cellulose effective mass ratio is taken as Gc (%), the following formula is satisfied:

$$\{(Ga-Gb)/(Gb+Gc)\} \times 100 \leq 20$$

where, $$Ga=\{(W0-Wa)/W0\} \times 100,$$

$$Gb=\{(W0-Wb)/W0\} \times 100,$$

where,

W0 denotes mass of a composite material before being immersed into hot xylene,

Wa denotes mass of a composite material after being immersed into hot xylene at 138° C. and then drying and removing xylene, and Wb denotes mass of a composite material after being immersed into hot xylene at 105° C. and then drying and removing xylene, $$Gc=\{Wc/W00\} \times 100,$$

where,

Wc denotes an amount of mass reduction of a dry composite material while a temperature is raised from 270° C. to 390° C. in a nitrogen atmosphere, and W00 denotes mass of a dry composite material before a temperature is raised (at 23° C.).

14. The cellulose-fiber dispersion polyethylene resin composite material described in claim 1 wherein the composite material contains polyethylene terephthalate and/or nylon, and wherein the total content of the polyethylene terephthalate and the nylon is 10 parts by mass or less based on a total content of 100 parts by mass of the polyethylene resin and the cellulose fiber.

15. The cellulose-fiber dispersion polyethylene resin composite material described in claim 12, wherein at least a part of the polyethylene resin and/or the polypropylene is derived from a recycled material.

16. The cellulose-fiber dispersion polyethylene resin composite material described in claim 1, wherein the composite material is obtained by using, as a raw material,
(a) polyethylene laminated paper having paper and a polyethylene thin film layer, and/or
(b) a beverage pack and a food pack each formed of the polyethylene laminated paper.

17. The cellulose-fiber dispersion polyethylene resin composite material described in claim 1, wherein the composite material is obtained by using, as a raw material, a cellulose-fiber adhesion polyethylene thin film piece.

18. The cellulose-fiber dispersion polyethylene resin composite material described in claim 1, wherein the composite material contains an inorganic material.

19. The cellulose-fiber dispersion polyethylene resin composite material described in claim 1, wherein, in the composite material, water absorption ratio after the composite material is immersed into water at 23° C. for 20 days is 0.1 to 10%, and impact resistance after the composite material is immersed into water at 23° C. for 20 days is higher than impact resistance before the composite material is immersed thereinto.

20. The cellulose-fiber dispersion polyethylene resin composite material described in claim 1, wherein a linear expansion coefficient is $1 \times 10^{-4}$ or less.

21. The cellulose-fiber dispersion polyethylene resin composite material described in claim 1, wherein a moisture content is less than 1% by mass.

22. A pellet used by the cellulose-fiber dispersion polyethylene resin composite material described in claim 1.

23. A formed body, which is formed by using the cellulose-fiber dispersion polyethylene resin composite material described in claim 1.

24. A production method for a cellulose-fiber dispersion polyethylene resin composite material, including obtaining a composite material formed by dispersing a cellulose fiber into a polyethylene resin by melt kneading a cellulose-fiber adhesion polyethylene thin film piece formed by adhering a cellulose fiber in the presence of water in a subcritical state.

25. The production method for the cellulose-fiber dispersion polyethylene resin composite material described in claim 24, wherein the melt kneading is performed by using a batch type closed kneading device, the thin film piece and water are charged into the batch type closed kneading device and agitated by rotating an agitation blade projected on an outer periphery of a rotary shaft of the device, and a temperature and a pressure in the device are increased by this agitation to convert water into a subcritical state.

26. The production method for the cellulose-fiber dispersion polyethylene resin composite material described in claim 24, wherein the cellulose-fiber adhesion polyethylene thin film piece is a thin film piece obtained by stripping off and removing a paper portion from polyethylene laminated paper in which a polyethylene thin film is adhered on a surface of paper, and is in a state of containing water.

27. The production method for the cellulose-fiber dispersion polyethylene resin composite material described in claim 24, wherein a proportion of the cellulose fiber in a total content of 100 parts by mass of the polyethylene resin and the cellulose fiber is 1 part by mass or more and 70 parts by mass or less and water absorption ratio wherein water absorption ratio and the cellulose effective mass ratio measured by a thermogravimetric analysis (TGA) satisfies the following formula [Formula B];

and under the condition that the composite material which is dried by a given drying conditions and is shaped into a given sheet form specimen is immersed into water at 23° C. for 20 days, and water absorption ratio is determined by based on measured values before and after the immersion according to the following [Formula A];

(Water absorption ratio [%])=(mass after immersion [g]−mass before immersion [g])×100/(mass before immersion [g])     [Formula A]

(Water absorption ratio [%])<(cellulose effective mass ratio [%])$^2$×0.01.     [Formula B]

28. The production method for the cellulose-fiber dispersion polyethylene resin composite material described in claim 24, wherein in the composite material, a proportion of the cellulose fiber in the total content of 100 parts by mass of the polyethylene resin and the cellulose fiber is 1 part by mass or more and 70 parts by mass or less, and the polyethylene resin satisfies a relationship: 1.7>half-width (Log(MH/ML))>1.0 in a molecular weight pattern obtained by gel permeation chromatography measurement.

29. A recycling method for a cellulose-fiber adhesion polyethylene thin film piece, including obtaining a cellulose-fiber dispersion polyethylene resin composite material by the production method for the cellulose-fiber dispersion polyethylene resin composite material described in claim 24.

30. A production method for a formed body, including mixing the cellulose-fiber dispersion polyethylene resin composite material described in claim 1 with at least any one of high density polyethylene and polypropylene, and obtaining a formed body by forming the mixture.

31. A production method for a formed body, including mixing the pellet described in claim 22 with at least any one of high density polyethylene and polypropylene, and obtaining a formed body by forming the mixture.

* * * * *